(12) United States Patent
Sugahara

(10) Patent No.: US 8,279,170 B2
(45) Date of Patent: Oct. 2, 2012

(54) IMAGE DISPLAY APPARATUS

(75) Inventor: Hiroto Sugahara, Aichi-ken (JP)

(73) Assignee: Brother Kogyo Kabushiki Kaisha, Aichi-Ken (JP)

( * ) Notice: Subject to any disclaimer, the term of this patent is extended or adjusted under 35 U.S.C. 154(b) by 853 days.

(21) Appl. No.: 12/286,318

(22) Filed: Sep. 30, 2008

(65) Prior Publication Data

US 2009/0085866 A1 Apr. 2, 2009

(30) Foreign Application Priority Data

Oct. 1, 2007 (JP) ................................ 2007-257250

(51) Int. Cl.
*G06F 3/045* (2006.01)
(52) U.S. Cl. ....................................................... 345/156
(58) Field of Classification Search .................. 345/156, 345/173, 77, 1.1, 2.1, 169, 104, 205, 206; 349/89, 162, 86, 166, 88; 73/849, 760
See application file for complete search history.

(56) References Cited

U.S. PATENT DOCUMENTS

| | | | |
|---|---|---|---|
| 6,943,773 B2 * | 9/2005 | Wong et al. | 345/156 |
| 7,027,110 B2 | 4/2006 | Akiyama et al. | |
| 7,109,967 B2 * | 9/2006 | Hioki et al. | 345/104 |
| 7,242,445 B2 | 7/2007 | Akiyama et al. | |
| 7,443,380 B2 * | 10/2008 | Nozawa | 345/156 |
| 2003/0227441 A1 | 12/2003 | Hoiki et al. | |
| 2005/0151782 A1 | 7/2005 | Ishida et al. | |
| 2005/0253643 A1 | 11/2005 | Inokawa et al. | |
| 2006/0274036 A1 | 12/2006 | Hioki et al. | |
| 2008/0030530 A1 | 2/2008 | Ishida et al. | |

FOREIGN PATENT DOCUMENTS

| | | | |
|---|---|---|---|
| JP | 2004-46792 | * | 2/2004 |
| JP | 2004-171512 | | 6/2004 |
| JP | 2004-279867 | | 10/2004 |
| JP | 2005-352927 | | 12/2005 |
| JP | 2006-035662 | | 2/2006 |

* cited by examiner

*Primary Examiner* — Nabil Hindi
(74) *Attorney, Agent, or Firm* — Frommer Lawrence & Haug LLP

(57) ABSTRACT

An image display apparatus includes an input unit which has a display on which an image is displayed, a flexible sheet typed substrate, and a bending detection section which is arranged on a surface of the substrate to detect a bending deformation of the substrate, and a display control section which controls to change an image to be displayed on the display, based on the bending deformation of the substrate detected by the bending detection section. Accordingly, it is possible to provide an image display apparatus which is capable of changing easily an image to be displayed on the display even when a user is not good at operating an equipment.

20 Claims, 31 Drawing Sheets

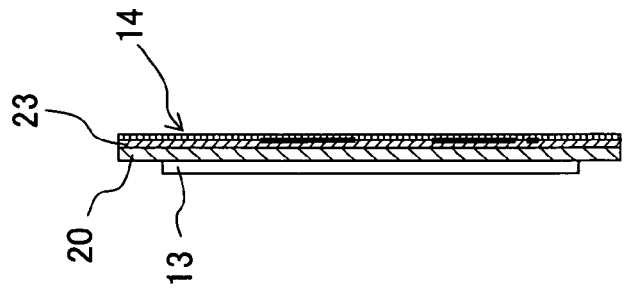
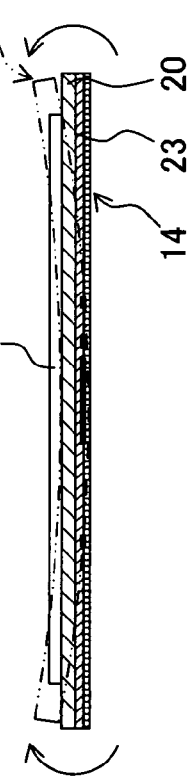
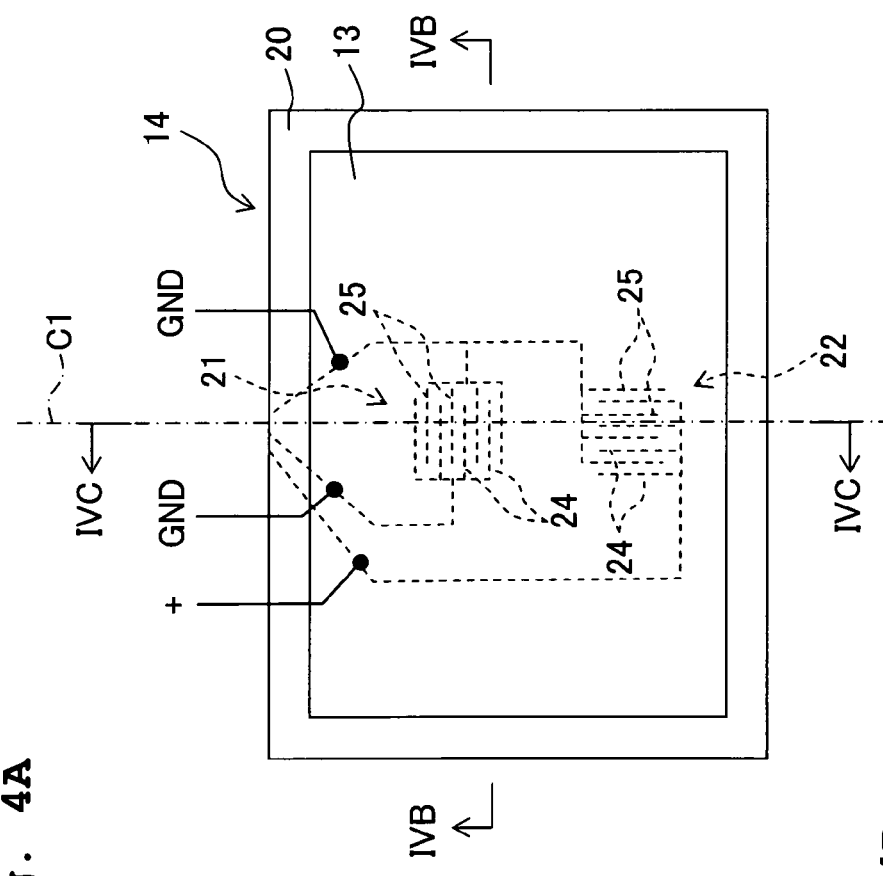

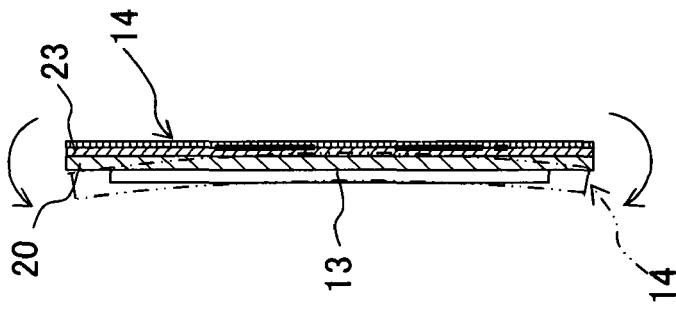
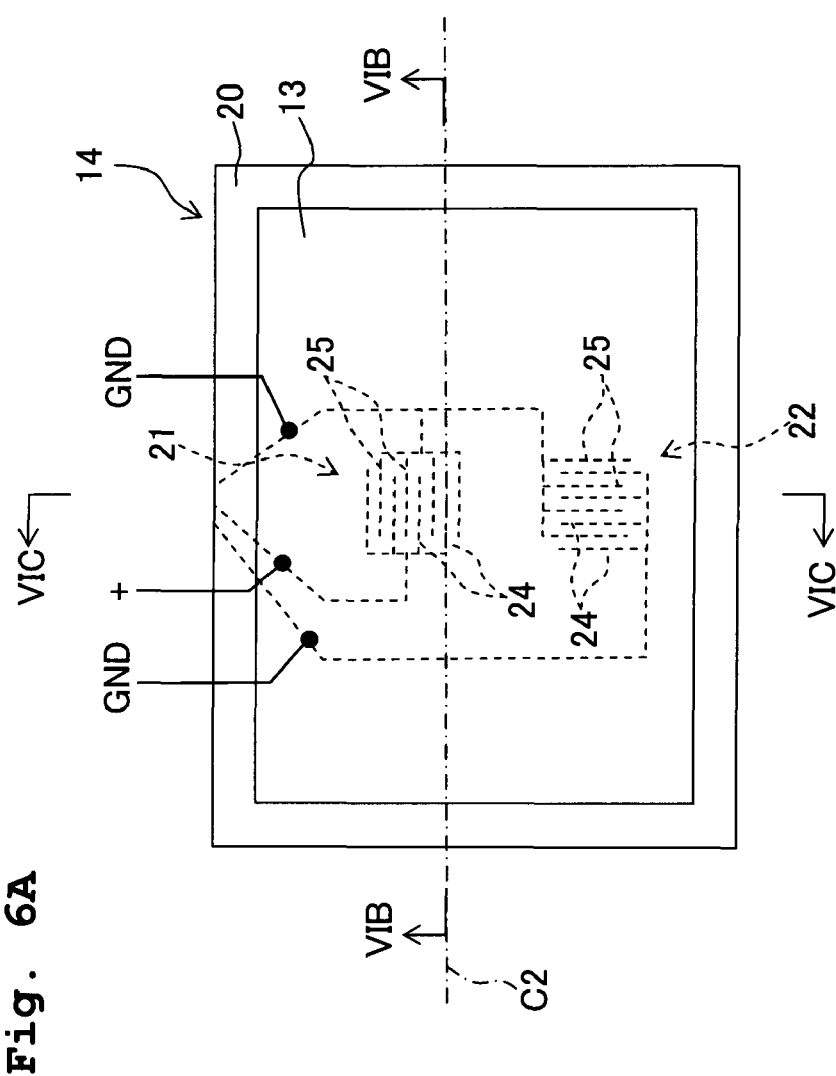
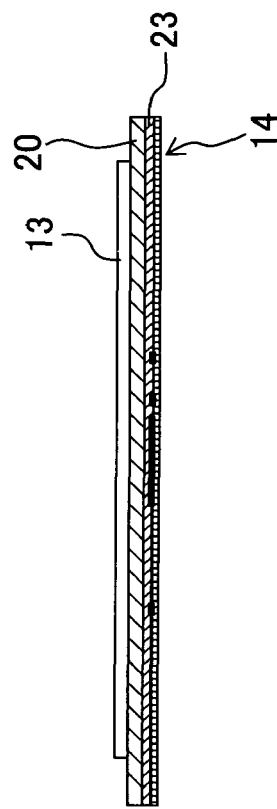

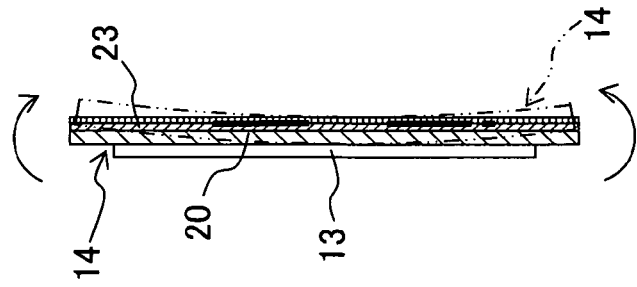
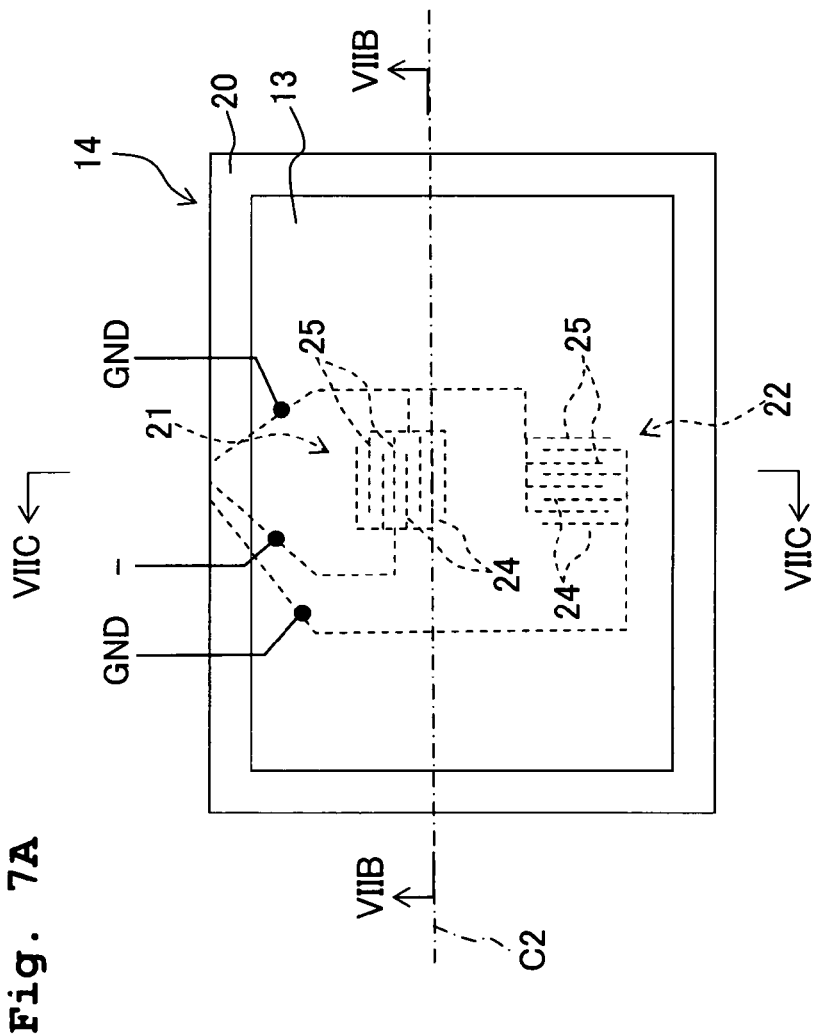
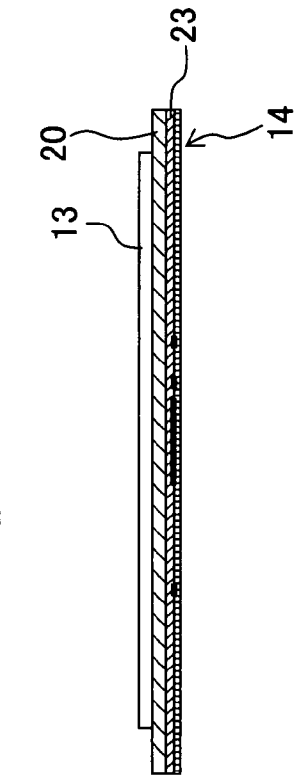

Fig. 8A

| ITEM | OPERATION OF USER | | FIRST ELECTRODE ELECTRIC POTENTIAL | |
|---|---|---|---|---|
| | BENDING AXIS | DIRECTION OF PROJECTION OF SUBSTRATE | FIRST BENDING DETECTION SECTION | SECOND BENDING DETECTION SECTION |
| A | C1 | DOWNWARD | GND | + |
| B | C1 | UPWARD | GND | − |
| C | C2 | DOWNWARD (BENDING SPEED – LOW) | + (LOW) | GND |
| D | C2 | UPWARD (BENDING SPEED – LOW) | − (LOW) | GND |
| E | C2 | DOWNWARD (BENDING SPEED – HIGH) | + (HIGH) | GND |
| F | C2 | UPWARD (BENDING SPEED – HIGH) | − (HIGH) | GND |

(NOTE) 'BENDING AXIS C1' IS AN AXIS PARALLEL TO SHORT-SIDE DIRECTION (DIRECTION OF SHORT SIDE) OF SUBSTRATE.
'BENDING AXIS C2' IS AN AXIS PARALLEL TO LONGITUDINAL DIRECTION (DIRECTION OF LONG SIDE) OF SUBSTRATE.

Fig. 8B

| ITEM | PROCESS CONTENT |
|---|---|
| A | REDUCTION (CONTRACTION) OF IMAGE |
| B | ENLARGEMENT OF IMAGE |
| C | SWITCH TO IMAGE OF SUBSEQUENT DATA |
| D | SWITCH TO IMAGE OF PREVIOUS DATA |
| E | SWITCH TO IMAGE OF DATA AFTER FIVE DATA |
| F | SWITCH TO IMAGE OF DATA BEFORE FIVE DATA |

Fig. 10A

| ITEM | OPERATION OF USER | | |
|---|---|---|---|
| | BENDING AXIS | BENDING POSITION | DIRECTION OF PROJECTION OF SUBSTRATE |
| A | C1 | CENTRAL PORTION | DOWNWARD |
| B | C1 | CENTRAL PORTION | UPWARD |
| C | C1 | RIGHT END PORTION | DOWNWARD |
| D | C1 | RIGHT END PORTION | UPWARD |
| E | C1 | LEFT END PORTION | DOWNWARD |
| F | C1 | LEFT END PORTION | UPWARD |
| G | C2 | UPPER END PORTION | DOWNWARD |
| H | C2 | UPPER END PORTION | UPWARD |
| I | C2 | LOWER END PORTION | DOWNWARD |
| J | C2 | LOWER END PORTION | UPWARD |

(NOTE) 'BENDING AXIS C1' IS AN AXIS PARALLEL TO SHORT-SIDE DIRECTION (DIRECTION OF SHORT SIDE) OF SUBSTRATE

Fig. 10B

| ITEM | FIRST ELECTRODE ELECTRIC POTENTIAL | | | | | PROCESS CONTENT |
|---|---|---|---|---|---|---|
| | DETECTING SECTION (UPPER) | DETECTING SECTION (LOWER) | DETECTING SECTION (CENTRAL) | DETECTING SECTION (LEFT) | DETECTING SECTION (RIGHT) | |
| A | GND | GND | + | GND | GND | CONTRACT AT CENTRAL PORTION |
| B | GND | GND | − | GND | GND | EXPAND AT CENTRAL PORTION |
| C | GND | GND | GND | GND | + | CONTRACT AT RIGHT END PORTION |
| D | GND | GND | GND | GND | − | EXPAND AT RIGHT END PORTION |
| E | GND | GND | GND | + | GND | CONTRACT AT LEFT END PORTION |
| F | GND | GND | GND | − | GND | EXPAND AT LEFT END PORTION |
| G | + | GND | GND | GND | GND | CONTRACT AT UPPER END PORTION |
| H | − | GND | GND | GND | GND | EXPAND AT UPPER END PORTION |
| I | GND | + | GND | GND | GND | CONTRACT LOWER END PORTION |
| J | GND | − | GND | GND | GND | EXPAND AT LOWER END PORTION |

Fig. 12A

| ITEM | BENDING AXIS | OPERATION OF USER |
|---|---|---|
| | | DIRECTION OF PROJECTION OF SUBSTRATE |
| A | C1 | DOWNWARD |
| B | C1 | UPWARD |
| C | C2 | DOWNWARD (BENDING SPEED – LOW) |
| D | C2 | UPWARD (BENDING SPEED – LOW) |
| E | C2 | DOWNWARD (BENDING SPEED – HIGH) |
| F | C2 | UPWARD (BENDING SPEED – HIGH) |
| G | C3 | DOWNWARD |
| H | C3 | UPWARD |

(NOTE) 'BENDING AXIS C1' IS AN AXIS PARALLEL TO SHORT-SIDE DIRECTION (DIRECTION OF SHORT SIDE) OF SUBSTRATE.
'BENDING AXIS C2' IS AN AXIS PARALLEL TO LONGITUDINAL DIRECTION (DIRECTION OF LONG SIDE) OF SUBSTRATE.
'BENDING AXIS C3' IS AN AXIS INCLINED AT 45° TOWARD LEFT WITH RESPECT TO SHORT-SIDE DIRECTION OF SUBSTRATE.

Fig. 12B

| ITEM | FIRST ELECTRODE ELECTRIC POTENTIAL | | | PROCESS CONTENT |
|---|---|---|---|---|
| | FIRST BENDING DETECTION SECTION | SECOND BENDING DETECTION SECTION | THIRD BENDING DETECTION SECTION | |
| A | GND | + | GND | REDUCTION OF IMAGE |
| B | GND | − | GND | ENLARGEMENT OF IMAGE |
| C | +(LOW) | GND | GND | SWITCH TO IMAGE OF SUBSEQUENT DATA |
| D | −(LOW) | GND | GND | SWITCH TO IMAGE OF PREVIOUS DATA |
| E | +(HIGH) | GND | GND | SWITCH OF IMAGE OF DATA AFTER FIVE DATA |
| F | −(HIGH) | GND | GND | SWITCH TO IMAGE OF DATA BEFORE FIVE DATA |
| G | GND | GND | + | IMAGE PROCESSING STARTS |
| H | GND | GND | − | IMAGE PROCESSING DISCONTINUED |

Fig. 18A

| ITEM | OPERATION OF USER | | DIRECTION OF PROJECTION OF SUBSTRATE |
|---|---|---|---|
| | BENDING AXIS | BENDING POSITION | |
| A | C1 | CENTRAL | DOWNWARD |
| B | C1 | CENTRAL | UPWARD |
| C | C1 | RIGHT END | DOWNWARD |
| D | C1 | RIGHT END | DOWNWARD |
| E | C2 | UPPER END | DOWNWARD |
| F | C2 | LOWER END | DOWNWARD |

(NOTE) 'BENDING AXIS C1' IS AN AXIS PARALLEL TO SHORT-SIDE DIRECTION (DIRECTION OF SHORT SIDE) OF SUBSTRATE.
'BENDING AXIS C2' IS AN AXIS PARALLEL TO LONGITUDINAL DIRECTION (DIRECTION OF LONG SIDE) OF SUBSTRATE.

Fig. 18B

| ITEM | FIRST ELECTRODE ELECTRIC POTENTIAL | | | | | | PROCESS CONTENT |
|---|---|---|---|---|---|---|---|
| | DETECTING SECTION (UPPER) | DETECTING SECTION (LOWER) | DETECTING SECTION (CENTRAL) | DETECTING SECTION (LEFT) | DETECTING SECTION (RIGHT) | | |
| A | GND | GND | + | GND | GND | | INCREASE IN NUMBER OF DISPLAY IMAGES (THUMBNAIL DISPLAY) |
| B | GND | GND | − | GND | GND | | DECREASE IN NUMBER OF DISPLAY IMAGES (STANDARD DISPLAY) |
| C | GND | GND | GND | GND | + | | SELECT IMAGE AT RIGHT |
| D | GND | GND | GND | + | GND | | SELECT IMAGE AT LEFT |
| E | + | GND | GND | GND | GND | | SELECT UPPER IMAGE |
| F | GND | + | GND | GND | GND | | SELECT LOWER IMAGE |

IMAGE DISPLAY APPARATUS

CROSS REFERENCE TO RELATED APPLICATION

The present application claims priority from Japanese Patent Application No. 2007-257250, filed on Oct. 1, 2007, the disclosure of which is incorporated herein by reference in its entirety.

BACKGROUND OF THE INVENTION

1. Field of the Invention

The present invention relates to an image display apparatus which displays an image.

2. Description of the Related Art

An apparatus such as a printer which records (prints) an image on a recording medium such as a printing paper is generally provided with a display (a display section) which is capable of displaying various information related to the image, and an operation panel which is operated by a user (refer to Japanese Patent Application Laid-open No. 2006-35662 for example). Moreover, in such printer, normally, it is possible to display on the display an image of inputted image data, and further, when the user operates various types of buttons provided on the operation panel, it is possible to carry out on display an image changing process such as a changing of a display image and an enlargement and a reduction of the image.

SUMMARY OF THE INVENTION

However, for a user such as an elderly person, who is not good at an operation of an equipment, it is quite difficult to carry out image changing process such as the changing of the display image and an enlargement and a reduction of an image on the display by operating these buttons upon understanding a function of each of the small buttons provided on the operation panel.

An object of the present invention is to provide an image display apparatus in which it is possible to change easily an image which is to be displayed on the display even for a person who is not good at operating an equipment.

According to a first aspect of the present invention, there is provided an image display apparatus which displays an image, including a display which displays an image;

an input mechanism which has a flexible and sheet shaped substrate, and a bending detection mechanism which is arranged on a surface of the substrate to detect a bending deformation of the substrate; and a display control mechanism which controls to change an image to be displayed on the display, based on the bending deformation of the substrate detected by the bending detection mechanism of the input mechanism.

According to the first aspect of the present invention, when the user causes a bending deformation in the substrate in the form of the flexible sheet, in the same manner as bending a paper, the bending deformation of the substrate is detected by the bending detection mechanism. Further, an image to be displayed on the display is changed by the display control mechanism. According to this arrangement, for changing the image to be displayed on the display, it is not necessary to carry out a plurality of operations of operation buttons provided on an apparatus main body, and even when the user is not good at operating an equipment, it is possible to change easily the image to be displayed on the display section.

In the image display apparatus of the present invention, when the bending deformation of the substrate is detected by the bending deformation mechanism, the display control mechanism may control the display to enlarge or reduce a displayed image which is currently displayed on the display.

In this case, it is possible to enlarge or reduce the image to be displayed on the display only by bending the substrate in the form of the sheet, and the operation is easy.

In the image display apparatus of the present invention, the display control mechanism may control the display section to enlarge the displayed image when the display control mechanism judges that the substrate is bent to form a projection upward, based on a detection result of the bending detection mechanism, and the display control mechanism may control the display section to reduce the displayed image when the display control mechanism judges that the substrate is bent to form a projection downward, based on a detection result of the bending detection mechanism.

In this case, when the substrate is bent by the user to form a projection frontward (upward) when seen from the user such that, the substrate comes closer to the user, the display control mechanism enlarges the image displayed on the display. Whereas, when the substrate is bent by the user to form a projection rearward (downward) when seen from the user such that, the substrate goes away from the user, the display control mechanism reduces the image which is being displayed on the display section. In this manner, since the operation of bringing the substrate closer corresponds to the enlargement of the image, and moreover, the operation of moving the substrate away corresponds to the reduction of the image, it is easy for the user to memorize instinctively the operation of bending the substrate at the time of enlarging and reducing the image.

In the image display apparatus of the present invention, the bending detection mechanism may have a plurality of bending detection sections arranged in a plurality of areas respectively, of the surface of the substrate, and when the bending deformation of the substrate is detected by one of the bending detection sections, the display control mechanism may control the display to enlarge or reduce the displayed image such that a portion, of the displayed image, corresponding to an area of the substrate arranged the one of the bending detection sections is to be a center of the enlargement or the reduction of the displayed image.

In this case, by bending the substrate in the area in which one of the plurality of bending detection sections is provided, it is possible to specify the center of the enlargement or the reduction when the image displayed on the display is enlarged or reduced.

In the image display apparatus of the present invention, the display control mechanism may control the display to display a image-list including a plurality of images at a time, and when the bending deformation of the substrate is detected by the bending detection mechanism, the display control mechanism may change the number of images in the image-list to be displayed on the display.

In this case, by bending the substrate, it is possible to change the number of images (thumbnail images) to be displayed as a list on the display section.

In the image display apparatus of the present invention, when the bending deformation of the substrate is detected by the bending detection mechanism, the display control mechanism may change an image displayed on the display to another image different from the displayed image.

In this case, by bending the substrate, it is possible to change easily the image to be displayed on the display section, to another different image.

The image display apparatus of the present invention may further include an image recording section which records an image on a recording medium; and an image control section which controls the image recording section to record an image displayed on the display on a recording medium.

In this case, it is possible to record on the recording medium, the image displayed on the display, by the image recording section.

In the image display apparatus of the present invention, when the recording control section judges that the bending deformation of the substrate detected by the bending deformation mechanism is of a type different from a bending deformation which changes the image to be displayed on the display, the recording control section may control the image recording section to record the displayed image on recording paper.

In this case, when the different type of bending deformation, which is different from the bending deformation for changing the image to be displayed on the display such as changing of the image and the enlargement and reduction of the image, is obtained, it is possible to select an image displayed currently on the display mechanism, and to make the image recording section record the selected image. Consequently, for giving an instruction for recording of the image, it is not necessary to operate an operating section different from the input mechanism.

In the image display apparatus of the present invention, the substrate may be formed of a rectangular sheet material, and when the recording control section judges that a corner portion of the rectangular substrate has been bent, based on the detection result of the bending detection section, the recording control section may control the image recording section to record the displayed image on a recording medium.

In this case, when an angular portion (a corner portion) of the substrate made of a sheet material having a rectangular shape are bent in the same manner as bending an end of a paper, it is possible to select the image which is being displayed currently, and to record the selected image on a recording medium.

In the image display apparatus of the present invention, the bending detection mechanism may have a plurality of the bending detection sections arranged on the plurality of areas respectively of the surface of the substrate.

In this manner, since the plurality of bending detection sections are provided to the substrate, it is possible to detect distinctively each of the bending deformations in the plurality of areas of the substrate. Moreover, it is also possible to detect distinctively a deformation in a different direction of bending. Therefore, it is possible to make the display carry out the processes by allocating the plurality of image changing processes such as the changing of the image and the enlargement and the reduction of the image, for the bending deformation of various types which can be detected distinctively.

In the image display apparatus of the present invention, the bending detection mechanism may have a piezoelectric layer provided on a surface of the substrate, and a first electrode and a second electrode which are arranged on a surface of the piezoelectric layer, and which are extended in parallel at an interval.

In this case, when the bending deformation of the substrate occurs, and when there is a distortion in a portion of the piezoelectric layer between the first electrode and the second electrode, an electric field is generated between the first electrode and the second electrode, according to the distortion. Accordingly, as there is an electric potential difference between the first electrode and the second electrode, it is possible to detect the bending deformation of the substrate.

In the image display apparatus of the present invention, the first electrode may include a plurality of first individual electrodes extending in one direction and being electrically conducted with each other, the second electrode may include a plurality of second individual electrodes extending in the one direction and being electrically conducted with each other, and the first and second individual electrodes may be arranged alternately on the one surface of the piezoelectric layer.

In this manner, the second electrodes and the first electrodes extended in the same direction on one surface of the piezoelectric layer are arranged alternately, and a plurality of sets of electrodes including the first electrode and the second electrode, exists on one surface of the piezoelectric layer. Therefore, it is possible to detect by one bending detection section, the bending deformation of the substrate which occurs in the area having a certain width, while increasing an electrical load generated by the bending deformation of the substrate, and improving a detection sensitivity by shortening a distance between the first electrode and the second electrode.

In the image display apparatus of the present invention, the bending detection mechanism may include a plurality of bending detection sections arranged on one surface of the substrate, and each of the bending detection sections may include the first electrode and the second electrode which are mutually parallel, and a direction of extension of the first and second electrodes may be different among the bending detection mechanisms.

In this case, since the direction of extension of the electrodes (the first electrodes and the second electrodes) is different between the bending detection sections, it is possible to detect distinctively each of the bending deformation of the substrate in different directions.

In the image display apparatus of the present invention, the bending detection mechanism may have a piezoelectric layer provided on a surface of the substrate, and a first electrode arranged on one surface of the piezoelectric layer, and a second electrode arranged on the other surface of the piezoelectric layer.

When the bending deformation of the substrate occurs, and when there is a distortion in a portion of the piezoelectric layer sandwiched between the first electrode arranged on one surface of the piezoelectric layer and the second electrode arranged on the other surface of the piezoelectric layer, an electric field is generated between the first electrode and the second electrode, according to the distortion. Accordingly, as there is an electric potential difference between the first electrode and the second electrode, it is possible to detect the bending deformation of the substrate.

In the image display apparatus of the present invention, the bending detection mechanism may have an electrical resistor which is formed of an electroconductive material arranged on a surface of the substrate, and of which an electrical resistance changes depending on the bending deformation of the substrate.

A principle of bending detection of the bending detection portion in the present invention is similar to a principle of measuring distortion of a distortion gauge. In other words, when the bending deformation occurs in the substrate, an electrical resistor provided on the surface of the substrate is elongated or contracted together with the substrate. Accordingly, an electrical resistance of the electrical resistor changes. Due to the change in the electrical resistance of the electrical resistor, it is possible to detect the bending deformation of the substrate.

In the image display apparatus of the present invention, the bending detection mechanism may have a plurality of acceleration sensors arranged on a surface of the substrate.

Since the acceleration sensors are provided on the substrate, it is possible to detect a change in a position of the substrate at a plurality of locations. Therefore, it is possible to detect the bending deformation of the substrate from a change in the position at the plurality of locations.

In the image display apparatus of the present invention, the display as a whole may have a flexibility, and the display may be provided on the substrate, and may be deformable by bending integrally with the substrate.

In this case, since the display is deformable by bending integrally with the substrate, it is possible to change an image of the display section by deforming by bending the substrate positioned at a rear side of the display section while observing the image which is displayed on the display section.

In the image display apparatus of the present invention, the display may be provided to be separated (isolated) from the substrate.

In this manner, when the display is provided to be separated (isolated) from the substrate, a structure of the input mechanism becomes simple. Moreover, unlike in the case in which the display is provided integrally with the substrate, the display is not particularly required to have flexibility, and it is not difficult to see the image due to the bending of the display section.

In the image display apparatus of the present invention, the substrate may be provided with an posture identifying section which identifies a regular usage posture corresponding to an image displayed on the display.

In a case in which the display section and the substrate are separated, when the user has held the substrate of the input unit (input mechanism) in hand, sometimes it is not known as to whether, the current attitude (posture) of the substrate is a regular attitude corresponding to the image of the display section. However, in the present invention, since the identifying section for identifying the regular usage attitude is provided to the substrate, the user, at the time of operating the substrate, is capable of identifying immediately as to by bending the substrate in which posture, it is possible to carry out correctly the image change of the display section. As the posture identifying section, it may be a mark or a display provided on the substrate, it may be identified by a shape of the substrate (for example, when there is a handle which makes it easy for the user to hold).

The image display apparatus of the present invention may further include a posture detecting section which detects a posture of the substrate.

In this case, since it is possible to identify the posture of the substrate at the image display apparatus side, it is possible to inform the user, as to whether or not the current posture of the substrate is a regular usage posture.

In the image display apparatus of the present invention, when a bending deformation has occurred in the substrate due to bending the substrate on a trial basis, the posture detecting section may detect the posture of the substrate based on a detection result of the bending detection mechanism.

In this case, when the substrate is bent on the trial basis by the user before actual operation, the posture detecting section identifies the current posture of the substrate based on the type of bending deformation of the substrate which is detected by the bending detection mechanism. Consequently, a special type of sensor for detecting the posture of the substrate is unnecessary.

The image display apparatus of the present invention, may further include an image-taking unit which has an image pickup section which picks up an image; and a control unit which controls operations of the image-taking unit, wherein the display may display an image picked up by the image pickup section, and the control unit may control the operations of the image acquiring unit based on a detection result from the bending detection mechanism.

In this case, it is possible to carry out easily, various operations such as zooming, taking an image, and recording of image of the image acquiring unit such as a digital camera and a digital video camera. The display section and the input mechanism may be formed integrally with the image acquiring unit or may be provided independently.

According to a second aspect of the present invention, there is provided an image display apparatus which displays an image, including a substrate in a form of a flexible sheet;

a display which displays an image, which is flexible, and which is provided integrally to the substrate;

a bending detection mechanism which is arranged on a surface of the substrate, and which detects a bending deformation of the substrate; and a display control mechanism which controls the display to change an image to be displayed on the display, based on the bending deformation of the substrate which is detected by the bending detection mechanism.

According to the second aspect of the present invention, when the user causes a bending deformation in the substrate in the form of the flexible sheet, in the same manner as bending a paper, the bending deformation of the substrate is detected by the bending detection section, and further, an image to be displayed on the display section which is provided integrally with the substrate is changed by the display control mechanism. According to this arrangement, for changing the image to be displayed on the display section, it is not necessary to carry out a plurality of operations of operation buttons, and even when the user is not good at operating an equipment, it is possible to change easily the image to be displayed on the display section. Moreover, since the display section is provided integrally with the substrate, it is possible to change the image of the display section by causing the substrate to be deformed by bending, which is positioned at a rear side of the display section.

According to the present invention, it is possible to change the image to be displayed on the display section only by causing the substrate of the input mechanism to be deformed by bending. Consequently, it is not necessary to carry out a plurality of operations of operation buttons provided on an apparatus main body, and even when the user is not good at operating an equipment, it is possible to change easily the image to be displayed on the display section.

BRIEF DESCRIPTION OF THE DRAWINGS

FIG. 3A is a plan view of the input unit and FIG. 3B is a cross-sectional view taken along a IIIB-IIIB line in FIG. 3A;

FIG. 4A, FIG. 4B, and FIG. 4C are diagrams showing a state of the input unit when a substrate is bent to be projected (bent to form a projection) toward a farther side (rearward side) of a paper surface around an axis C1, where, FIG. 4A is a plan view, FIG. 4B is a cross-sectional view taken along a IVB-IVB line in FIG. 4A, and FIG. 4C is a cross-sectional view taken along a IVC-IVC line in FIG. 4A;

FIG. 5A is a plan view, FIG. 5B is a cross-sectional view taken along a VB-VB line in FIG. 5A, and FIG. 5C is a cross-sectional view taken along a VC-VC line in FIG. 5A;

FIG. 6A, FIG. 6B, and FIG. 6C are diagrams showing a state of the input unit when a substrate is bent to be projected toward a farther side (rearward side) of the paper surface around an axis C2, where, FIG. 6A is a plan view, FIG. 6B is a cross-sectional view taken along a VIB-VIB line in FIG. 6A, and FIG. 6C is a cross-sectional view taken along a VIC-VIC line in FIG. 6A;

FIG. 7A, FIG. 7B, and FIG. 7C are diagrams showing a state of the input unit when a substrate is bent to be projected toward a frontward side of the paper surface around the axis C2, where, FIG. 7A is a plan view, FIG. 7B is a cross-sectional view taken along a VIIB-VIIB line in FIG. 7A, and FIG. 7C is a cross-sectional view taken along a VIIC-VIIC line in FIG. 7A;

FIGS. 8A and 8B are tables showing contents of an image changing process allocated to a mode of bending deformation of the substrate;

FIGS. 10A and 10B are tables showing contents of an image changing process allocated to a mode of bending deformation of a substrate, of the first modified embodiment;

FIGS. 12A and 12B are tables showing contents of an image changing process allocated to a mode of bending deformation of a substrate, of the second modified embodiment;

FIG. 13A is a plan view, and FIG. 13B is a cross-sectional view taken along a XIIIB-XIIIB line in FIG. 13A;

FIG. 14A is a plan view, and FIG. 14B is a cross-sectional view taken along a XIVB-XIVB line in FIG. 14A;

FIG. 15A is a plan view, and FIG. 15B is a cross-sectional view taken along a XVB-XVB line in FIG. 15A;

FIG. 16A is a plan view, and FIG. 16B is a cross-sectional view taken along a XVIB-XVIB line in FIG. 16A;

FIGS. 18A and 18B are tables showing contents of an image changing process allocated to a mode of bending deformation of a substrate, of a seventh modified embodiment;

DETAILED DESCRIPTION OF THE PREFERRED EMBODIMENTS

First Embodiment

Figure 1:
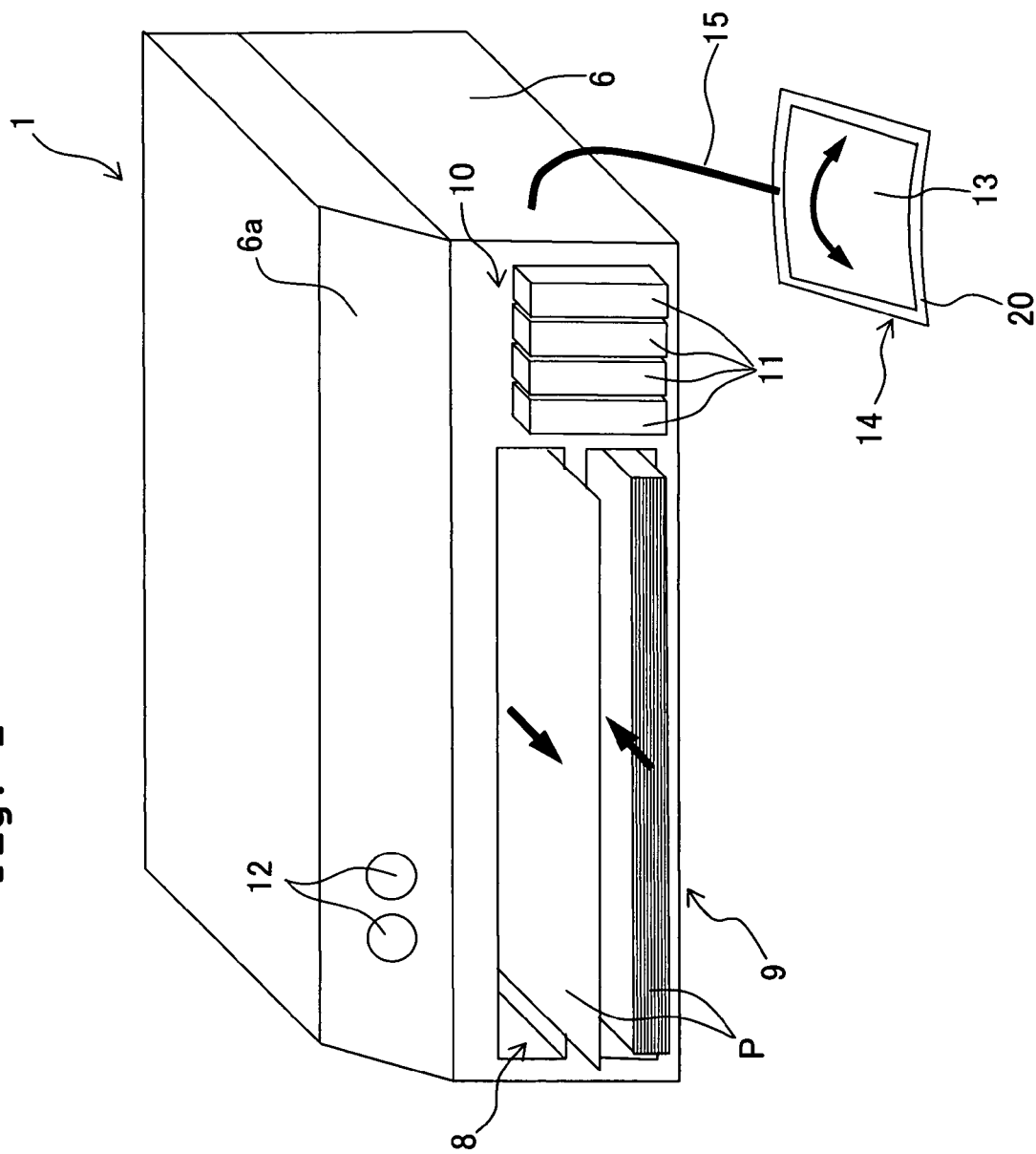
FIG. 1 is a schematic perspective view of a printer according to a first embodiment of the present invention.

Next, a first embodiment of the present invention will be described below. FIG. 1 is a perspective view of a printer of the first embodiment, and FIG. 2 is a block diagram showing schematically an electrical structure of the printer.

Figure 2:
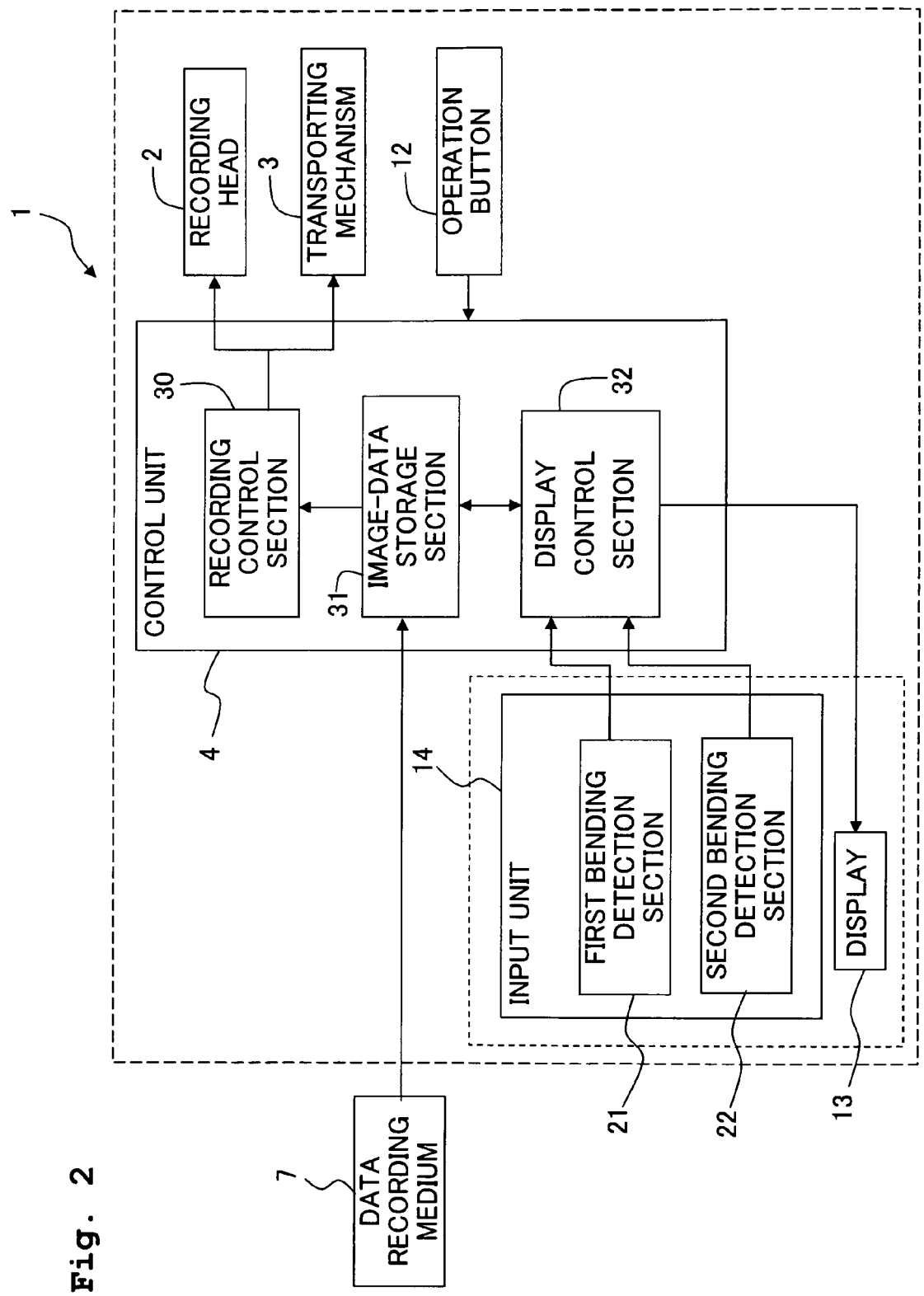
FIG. 2 is a block diagram showing schematically an electrical structure of the printer of the first embodiment.

As shown in FIGS. 2 and 3, a printer 1 (image display apparatus) of the first embodiment includes a recording head 2 (image recording section) which records an image on a printing paper P (recording medium), a transporting mechanism 3 which transports the printing paper P in a predetermined direction (frontward direction in FIG. 1), and a control unit 4 which controls various mechanism of the printer 1 including the recording head 2 and the transporting mechanism 3.

As shown in FIG. 1, the printer 1 has a printer-body 6 having a substantially rectangular parallelepiped shape, and the recording head 2, the transporting mechanism 3, and the control unit 4 are accommodated inside the printer-body 6. As the recording head 2, a head which carries out printing on the printing paper P by a known method such as a head of an ink-jet type, a laser type, or a thermal transferring type is used. While the data recording medium 7 in which image data is recorded (refer to FIG. 2) is connected to the printer 1, the recording head 2 records on the printing paper P an image of the image data (image file) which is input from a data recording medium 7, based on a command from the control unit 4. In the following description, one image data (image file) means a set of integrated data which forms one image.

A part of a lower-half portion of the printer-body 6 is open frontward. A paper feeding tray 9 in which the printing papers P are accommodated, and paper discharge tray 8 to which the printing papers P with an image recorded thereon are discharged are provided in the open portion. The transporting mechanism 3 drives transporting rollers, which are rotated by a motor, to transport the recording paper P on the paper feeding tray 9 to the recording head 2 in the printer-body, and to discharge the printing paper P having an image recorded thereon by the recording head 2 to the paper discharge tray 8 at the front.

A cartridge mounting portion 10 is provided on a front surface of the lower-half portion of the printer-body 6 at a side of the paper feeding tray 9 and the paper discharge tray 8. Four ink cartridges 11 containing inks of four colors (yellow, magenta, cyan, and black) respectively, are detachably mounted on the cartridge mounting portion 10.

An upper portion of the printer-body 6 is inclined frontward, toward a user who is at a frontward side of the paper surface in FIG. 1. A plurality of operation buttons 12 which are operated by the user are provided on an inclined surface 6a.

Figure 3A:
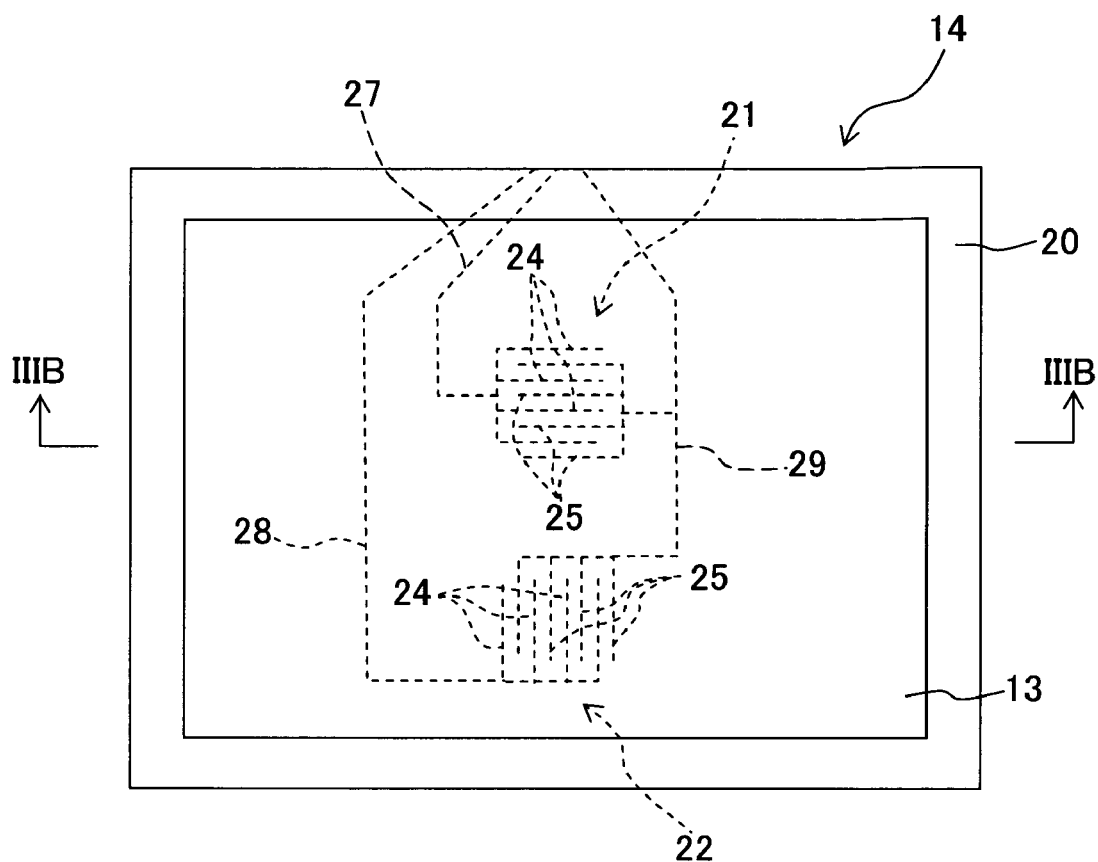
FIG. 3A and FIG. 3B are diagrams showing an input unit, where.
Figure 3B:
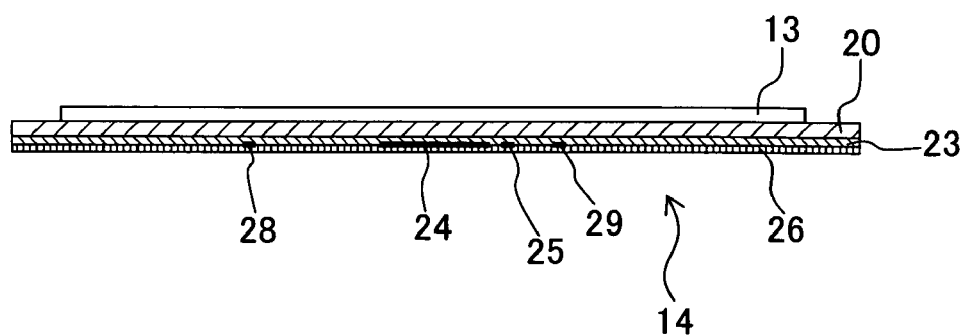

Furthermore, the printer 1 includes an input unit (input mechanism) having a flexible substrate 20 in the form of a sheet, and two bending detection sections 21 and 22 (bending detection mechanism) which are arranged on a surface of the substrate 20, and which detects bending deformation of the substrate 20. FIG. 3A is a plan view of the input unit 14, and FIG. 3B is a cross-sectional view taken along a line IIIB-IIIB in FIG. 3A. As shown in FIGS. 3A and 3B, the surface of the substrate 20 of the input unit 14 is provided with a display 13 (display section) having flexibility as a whole, and the display 13 is deformable by bending integrally with the substrate 20. A so-called electronic paper having a thickness of a paper of one by several tenths of millimeter, and on which data is erasable and displayable by applying a voltage etc. can be cited as an example of such display 13. As shown in FIG. 1, the input unit 14 and the display 13 are connected to the control unit 4 stored (accommodated) inside the printer-body 6 (refer to FIG. 2), via a cable 15.

When the user changes an image to be displayed on the display 13, the substrate 20 of the input unit 14 is operated as bending a paper by the user. At this time, a bending deformation developed in the substrate 20 is detected by the two bending detection sections 21 and 22 provided to the substrate 20. The control unit 4 changes an image to be displayed on the display 13 based on a mode of the bending deformation of the substrate 20 detected by the bending detection sections 21 and 22.

The input unit 14 will be described below concretely. As shown in FIG. 3A, the substrate 20 is formed to be rectangular shaped in a plan view. Moreover, as the flexible substrate 20, it is possible to use a resin sheet material made of a synthetic resin material such as polyimide, or a thin plate made of a metallic material such as an aluminum alloy and stainless steel. Note that in the description a direction parallel to a longer side of the rectangular shaped substrate is called as "a longitudinal direction", and a direction parallel to a shorter side, that is, orthogonal to the longitudinal direction is called as "a short-side direction".

The two bending detection sections (a first bending detection section 21 and a second bending detection section 22) are provided on a rear surface (a surface on opposite side of the display 13, that is, a surface on a rearward side of the paper surface in FIG. 3). The first bending detection section 21 and the second bending detection section 22 are arranged side by side in a direction of short side (in a vertically direction in FIG. 3A), at a central portion in a longitudinal direction (left-right direction in FIG. 3A) of the substrate 20. Moreover, as the first bending detection section 21 and the second bending detection section 22, a detector in which an electromechanical conversion effect (a mechanical distortion is converted to an electric signal) has been used is adopted in the first embodiment. In other words, each of the first bending detection section 21 and the second bending detection section 22 has a piezoelectric layer 23 formed on a rear surface of the substrate, and two types of electrodes (a first electrode 24 and a second electrode 25) which are formed on a surface (a rear surface) of the piezoelectric layer 23, on an opposite side of the substrate 20, and extended in parallel with a gap mutually.

The piezoelectric layer 23 is made of a piezoelectric material which is principally composed of lead zirconate titanate (PZT), which is a solid solution of lead titanate and lead zirconate, and which is a ferroelectric substance, and is formed to cover the rear surface of the substrate 20 entirely. In other words, the piezoelectric layer 23 is common between the first bending detection section 21 and the second bending detection section 22. The piezoelectric layer 23 is formed on the substrate by a method such as an aerosol deposition method, a sputtering method, and a sol-gel method.

In each of the first bending detection section 21 and the second bending detection section 22, on the rear surface (surface not facing the display 13) of the piezoelectric layer 23, a plurality of first electrodes 24 in the comb teeth form, which are extended parallel along one direction, and which are in mutual conduction, and a plurality of second electrodes 25 in the same comb teeth form, which are extended parallel to the first electrodes 24, and which are in mutual conduction. Furthermore, the first electrodes 24 and the second electrodes 25 are arranged alternately. The first electrodes 24 and the second electrodes 25 are formed of an electroconductive material such as gold, copper, silver, palladium, platinum, or titanium, by using a method such as a screen printing method and a vapor deposition method.

As shown in FIG. 3A, a direction of extension of the electrodes (the first electrodes 24 and the second electrodes 24) differ mutually for the first bending detection section 21 and the second bending detection section 22. More concretely, a direction of extension of the electrodes of the first bending detection section 21, arranged at a position somewhat on upper side (upward) of a central portion of the substrate 20 is parallel to the longitudinal direction of the rectangular substrate 20. On the other hand, a direction of extension of the electrodes of the second bending detection section 22, arranged at a position somewhat on a lower side (downward) of a central portion of the substrate 20 is parallel to a short side direction of the substrate 20. In other words, the direction of extension of the electrodes of the first bending detection section 21 and the direction of extension of the electrodes of the second bending detection section 22 are mutually orthogonal.

In the manufacturing stages, a low electric potential (such as 0 V (ground electric potential)) has been applied to the first electrode 24 and a high electric potential (such as 50 V) has been applied to the second electrode 25. Accordingly, in each of the first bending detection section 21 and the bending detection section 22, a portion of the piezoelectric layer 23 between the first electrode 24 and the second electrode 25 is polarized in a direction from the second electrode 25 to the first electrode 24.

As shown in FIG. 3A, a wire 27 and a wire 28 are drawn respectively from the plurality of first electrodes 24 which are brought into mutual conduction of the first bending detection section 21 and the second bending detections section 22, and these two wires 27 and 28 for the two first electrodes 24 are connected to the control unit 4 (refer to FIG. 2). Moreover, the plurality of second electrodes 25 of the first bending detection section 21 and the plurality of second electrodes 25 of the second bending detection section 22 are connected to a common wire 29. The common wire 29 is connected to a ground wire provided toward the control unit 4, and all the second electrodes 25 are kept at the ground electric potential all the time via the common wire 29.

As shown in FIG. 3B, an insulating layer 26 is formed on the rear surface of the piezoelectric layer 23, to cover all the first electrodes 24 and the second electrodes 25 of the first bending detection section 21 and the second bending detection section 22. It is possible to form the insulating layer 26 by a synthetic resin material having an insulating property, such as polyimide. In this manner, since the first electrodes 24 and the second electrodes 25 are covered by the insulating layer 26, it is possible to avoid occurrence of problems such as an exfoliation and a damage of the electrode, and a short circuit between the first electrode 24 and the second electrode 25.

Next, an action when the first bending detection section 21 and the second bending detection section 22 detect the bending deformation of the substrate 20 will be described with reference to FIGS. 4A to 7C. In FIGS. 4A to 7C, '+' shows that an electric potential of the first electrode is a positive electric potential, '−' shows that an electric potential of the first electrode is a negative electric potential, and 'GND' shows that an electric potential of the electrode (the first electrode 24 or the second electrode 25) is the ground electric potential. Moreover, FIG. 4A shows a plan view of the input unit 4, FIG. 4B show a cross-sectional view along a line IVB-IVB, and FIG. 4C show a cross-sectional view along a line IVC-IVC. FIGS. 5A to 7A, FIGS. 5B to 7B, and FIGS. 5C to 7C are similar to FIGS. 4A, 4B and 4C, respectively.

When the bending deformation occurs in an area of the substrate 20 in which the first bending detection section 21 and the second bending detection section 22 are provided, and a distortion (deformation) occurs in a portion of the piezoelectric layer 23 between the first electrode 24 and the second electrode 25, an electric field (in other words, an electric potential difference) is generated between the first electrode 24 and the second electrode 25, in accordance with the distortion. This action will be described further concretely by dividing for each mode of the bending deformation of the substrate 20.

As shown in FIGS. 4A to 5C, when the bending deformation around an axis C1 parallel to a short axis direction has occurred in the substrate 20, the piezoelectric layer 23 is deformed along with the substrate 20, to form a projection toward a front ward side (upward) or a rearward side (downward). At this time, in the second bending detection section 22, a portion on a lower surface of the piezoelectric layer 23, between the first electrode 24 and the second electrode 25 is elongated or contracted along a direction (longitudinal direction of the substrate 20) orthogonal to the direction of extension of electrode.

In other words, as shown by alternate long and two short dashes line in FIG. 4B, when the substrate 20 and the piezoelectric layer 23 are bent to form a projection downward around the axis C1, in the second bending detection section 22 provided on the rear surface of the substrate 20, a lower surface portion of the piezoelectric layer 23 is elongated in a direction parallel to a direction of polarization thereof. At this time, an electric field in a direction opposite to the direction of polarization (in other words, an electric field in a direction from the first electrode 24 toward the second electrode 25) is generated at an interior of the piezoelectric layer 23, and as a result of this, a positive electric potential (+) higher than the electric potential of the second electrode 25 (ground electric potential) is generated in the first electrode 24.

Figure 5C:
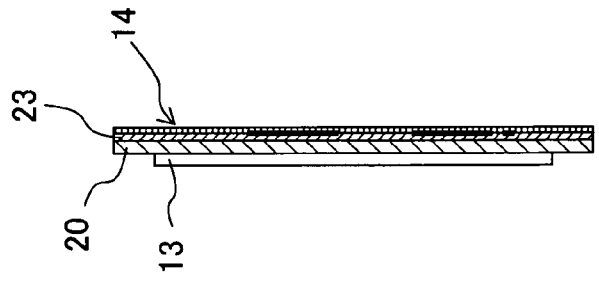
FIG. 5A, FIG. 5B, and FIG. 5C are diagrams showing a state of the input unit when a substrate is bent to be projected toward a frontward side of the paper surface around the axis C1, where.
Figure 5A:
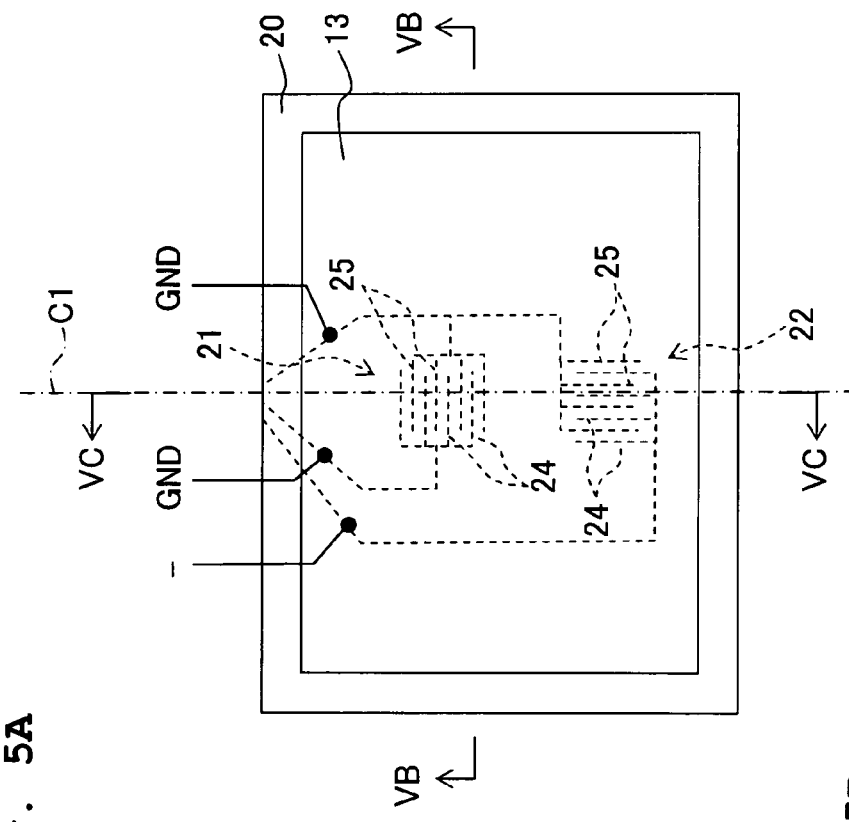
Figure 5B:
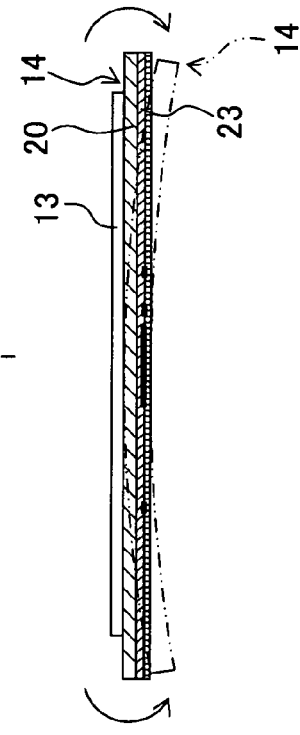

Moreover, as shown by alternate long and two short dashes lines in FIG. 5B, when the substrate 20 and the piezoelectric layer 23 are bent to form a projection upward around the axis C1, in the second bending detection section 22 provided on the rear surface of the substrate 20, the lower surface portion of the piezoelectric layer is contracted in a direction parallel to the direction of polarization thereof. At this time, an electric field in a direction same as the direction of polarization (in other words, an electric field in a direction from the second electrode 25 toward the first electrode 24) is generated inside the piezoelectric layer 23, and as a result of this, a negative electric potential (−) lower than the electric potential of the second electrode 25 (ground electric potential) is generated in the first electrode 24.

At this time, even in another first bending detection section 21, a deformation (elongation or contraction) occurs in a portion of the piezoelectric layer 23 sandwiched between the first electrode 24 and the second electrode 25. However, a direction of the deformation is parallel to the direction of extension of the electrode (longitudinal direction of the substrate 20), and is a direction different from (orthogonal to) the direction of polarization of the piezoelectric layer 23 in the first bending detection section 21. Therefore, in the another first bending detection section 21, almost no electric potential difference is generated between the first electrode 24 and the second electrode 25.

As shown in FIGS. 6A to 7C, when a bending deformation around an axis C2 parallel to the longitudinal direction has occurred in the substrate 20, the action of the second bending detection section 22 described above occurs this time in the first bending detection section 21. In other words, in the first bending detection section 21, a portion on the lower surface of the piezoelectric layer 23, between the first electrode 24 and the second electrode 25 is elongated or contracted along a direction orthogonal to the direction of extension of the electrode (short-side direction of the substrate 20).

As shown by long and two short dashes lines in FIG. 6C, when the substrate 20 and the piezoelectric layer 23 are bent to form a projection downward around the axis C2, in the first bending detection section 21 provided on the rear surface of the substrate 20, the lower surface portion of the piezoelectric layer 23 is elongated in a direction parallel to the direction of polarization thereof. At this time, an electric field in the direction opposite to the direction of polarization (in other words, an electric field in a direction from the first electrode 24 toward the second electrode 25) is generated in the piezoelectric layer 23, and as a result of this, a positive electric potential (+) higher than the electric potential of the second electrode 25 (ground electric potential) is generated in the first electrode 24.

As shown by long and two short dashes lines in FIG. 7C, when the substrate 20 and the piezoelectric layer 23 are bent to form a projection upward around the axis C2, in the first bending detection section 21 provided on the rear surface of the substrate 20, the lower surface portion of the piezoelectric layer 23 is contracted in the direction parallel to the direction of polarization thereof. At this time, an electric field in the direction same as the direction of polarization (in other words, an electric field in the direction from the second electrode 25 toward the first electrode 24) is generated in the piezoelectric layer 23, and as a result of this, a negative electric potential (−) lower than the electric potential of the second electrode 25 (ground electric potential) is generated in the first electrode 24.

At this time, even in another second bending detection section 22, a deformation (elongation or contraction) occurs in a portion of the piezoelectric layer 23 between first electrode 24 and the second electrode 25, and the direction of the deformation is parallel to the direction of extension of the electrode (short-side direction of the substrate 20), and is a direction different from (orthogonal to) the direction of polarization of the piezoelectric layer 23. Therefore, in the second bending detection section 22, almost no electric potential difference is generated between the first electrode 24 and the second electrode 25.

In this manner, since the direction of extension of the first electrode 24 and the second electrode 25 differs mutually (is orthogonal) between the first bending detection section 21 and the second bending detection section 22 provided to the substrate 20, it is possible to detect distinctly the bending deformation of the substrate 20 around the two axes namely the axis C1 and the axis C2 mutually orthogonal by the first bending detection section 21 and the second bending detection section 22.

Even when each of the first bending detection section 21 and the second bending detection section 22 doesn't have the plurality of first electrodes 24 and the plurality of second electrodes 25 arranged alternately, but have one each of the mutually parallel first electrode 24 and the second electrode 25, and when it is possible to detect accurately at the control unit 4, a change in the electric potential of the first electrode 24 when the piezoelectric layer 23 between the set of the first electrode 24 and the second electrode 25 has deformed, it is possible to detect the bending deformation of the substrate 20. However, when the change in the electric potential of the first electrode 24 is small, it is difficult to detect correctly the change in the electric potential, and there is a fear of misdetection. For preventing the misdetection, it is necessary to make small a distance (gap) between the first electrode 24 and the second electrode 25, and to make as large as possible the change in the electric potential of the first electrode 24 when the piezoelectric layer 23 is bent, and to improve a detection sensitivity. In this point of view, an area of the substrate 20 which is covered by one bending detection section for detecting the bending deformation of the substrate 20 becomes extremely small.

However, in the first embodiment, since the plurality of first electrodes 24 and the plurality of second electrodes 25 extended in the same direction are arranged alternately on the same surface of the piezoelectric layer 23 in each of the first bending detection section 21 and the second bending detection section 22, there exists a plurality of sets of electrodes including the first electrode 24 and the second electrode 25. Therefore, it is possible to detect the bending deformation of the substrate 20 occurred in an area having a certain width (dimension) by one bending detection section. In addition, it is possible to improve the detection sensitivity because the distance between the first electrode 24 and the second electrode 25 can be shortened. Moreover, as there exists a plurality of sets of electrodes including the first electrode 24 and the second electrode 25, it is possible to increase an amount of electric load generated due to the bending deformation of the substrate 20, and the detection sensitivity is improved.

Moreover, in the first embodiment, as shown in FIG. 3B, the piezoelectric layer 23 is arranged on the surface of the substrate 20, on the opposite side of the display 13. In other words, the piezoelectric layer 23 and the display 13 are arranged on opposite sides sandwiching the substrate 20. In this case, as compared to a case in which the three layers are stacked in order of the substrate 20, the piezoelectric layer 23, and the display 13 (when the piezoelectric layer 23 is arranged between the substrate 20 and the display 13), a distance from an indifferent line of bending of the three-layered structure up to the lower surface of the piezoelectric layer 23 increases. Therefore, since the distortion developed in the lower surface of the piezoelectric layer 23 when the substrate 20 is bent increases, and the electric potential generated in the first electrode 24 becomes high, it becomes easy to detect the bending deformation of the substrate 20.

In the bending deformation as described above, upon bending the substrate 20 by a strong force, more the speed of bending (bending speed) of the substrate 20, larger is a magnitude of the electric field generated in the piezoelectric layer 23. In other words, when the second electrode 25 is kept all the time at a constant electric potential (ground electric potential), more the bending speed of the substrate 20, higher is (an absolute value of) the electric potential of the first electrode 24. Consequently, from the magnitude of the (absolute value of the) electric potential of the first electrode 24, it is possible to detect distinctly the difference in the bending speed of the bending deformation which has occurred in the substrate 20.

Accordingly, the control unit 4 is capable of identifying distinctly a mode of the plurality of bending deformations occurring in the substrate 20, based on a voltage signal (electric potential of the first electrode 24) which is output from each of the first bending detection section 21 and the second bending detection section 22.

In the printer 1 of the first embodiment, when the substrate 20 of the input unit 14 is bend in a predetermined mode set in advance as bending a paper, the bending deformation occurred in the substrate 20 is detected by the first bending detection section 21 and the second bending detection section 22. Then an image to be displayed on the display 13 is changed according to the bending deformation which is detected (image changing process). A concrete content of the image changing process will be described in detail in the following description of the control unit 4.

Next, an electrical structure of the printer 1 regarding the control unit 4 will be described below in detail with reference to a block diagram in FIG. 2. The control unit 4 includes a Central Processing Unit (CPU), a Read Only Memory (ROM) in which computer programs and data etc. for controlling various mechanisms of the printer are stored, a Random Access Memory (RAM) which temporarily stores data to be processed by the CPU, and an input-output interface which inputs and outputs signals between the printer 1 and an external apparatus (unit).

As shown in FIG. 2, the control unit 4 includes a recording control section 30 (recording control mechanism), an image-data storage section 31 in which image data input from the data recording medium 7 is stored, and a display control section 32 (display control mechanism) which controls the display 13. A plurality of image data ordered in advance, based on certain conditions such as names of data files (for example, in alphabetic order), and time and date of creating of image data (time-stamp information) is recorded in image folders. Moreover, when the data recording medium 7 is connected to the printer 1, the plurality of image data which is read out from the data recording medium is stored in the image-data storage section 31.

As the data recording medium 7 in which the image data is stored, a storage device such as a USB memory and a memory card which is to be plugged into a slot of the printer, or an external storage device (unit) to be connected to the control unit 4 by a cable or by a wireless connection is appropriate. Moreover, the data which is recorded in the data recording medium 7 may not be only a still image data which is taken by a digital camera, and may be also a video data (movie data) which is shot by a digital video camera. Here, the video data is a set of a plurality of still image data which is continued time wise, and when this video data is input from the data recording medium 7, in the control unit 4, the plurality of still image data is extracted from the video data, and a part of (some of) the plurality of still image data is displayed on the display 13, or, a still image is recorded on the printing paper P.

The recording control section 30 controls the recording head 2 and the transporting mechanism 3 to print on the printing paper P, an image of image data selected by a user, upon referring to the data recorded in the image-data storage section 31. Moreover, the display control section 32 controls the display 13 to display the information regarding a state of the printer 1 ("now printing" or "a standby state"), an error message or the like, to notify the users of the information.

Furthermore, the display control section 32 has a function of changing an image to be displayed on the display 13 according to the mode of the bending deformation of the substrate 20, which is detected by the first bending detection section 21 and the second bending detection section 22, when the substrate 20 of the input unit 14 is bent by the user. "Changing an image to be displayed on the display 13" indicates changing a part of the image or the entire image to be displayed on an entire screen of the display 13. Consequently, this includes as a matter of course, switching (changing) an image of certain image data which is displayed currently to an image of another image data, as well as carrying out an image processing such as an enlargement and reduction (zooming in and zooming out) of the image which is displayed currently.

The recording control section 30, the image-data storage section 31, and the display control section 32 are realized by the CPU, the ROM, and the RAM etc. forming the control unit 4. In other words, various computer programs such as a computer program for controlling the recording head 2 and the transporting mechanism 3 and a computer program for controlling the image to be displayed on the display 13 are stored in the ROM of the control unit 4. When the computer programs stored in the ROM are executed by the CPU of the control unit 4, a function of each of the recording control section 30, the image-data storage section 31, and the display control section 32 is realized.

Image Changing Process

In the following description, an image changing process to be realized by the display control section 32 when the substrate 20 of the input unit 14 is bent by the user will be discussed.

As described above, the printer 1 of the first embodiment is capable of detecting distinctly, the mode of the plurality of bending deformation developed in the substrate 20 when the substrate 20 is subjected to the bending operation by the user, because the first bending detection section 21 and the second bending detection section 22 are provided to the substrate 20. Therefore, as shown in FIGS. 8A and 8B, six types of image changing process regarding the enlargement and reduction of the image, and the switching of the image are assigned to six types of bending deformations (items A to F), respectively, the six types of bending deformations being detected distinctly by the first bending detection section 21 and the second bending detection section 22.

Enlargement and Reduction of Image

As shown in FIG. 4, when the substrate 20 in the form of a rectangular sheet is bent by the user to form a projection downward (rearward side as viewed from the user), around the axis C1 parallel to the short-side direction of the substrate 20 (item A in FIGS. 8A and 8B), the lower surface portion of the piezoelectric layer 23 is elongated (extended) in the longitudinal direction of the substrate 20. Then an electric field in a direction opposite to the direction of polarization (direction from the first electrode 24 toward the second electrode 25) is generated in an area, of the second bending detection section 22, between the first electrode 24 and the second electrode 25, and a positive electric potential is generated in the first electrode 24 of the second bending detection section 22. Upon receiving this signal, the display control section 32 makes a judgment that the substrate 20 is bent to form a projection downward, around the axis C1, and the display control section 32 displays on the display 13 a contracted image in which the displayed image is made further smaller.

Moreover, as shown in FIG. 5, when the substrate 20 is bent to form a projection upward (frontward side when viewed from the user), around the axis C1 parallel to the short-side direction of the substrate 20 (item B in FIGS. 8A and 8B), the lower surface portion of the piezoelectric layer 23 is contracted in the longitudinal direction of the substrate 20. Then an electric field in a direction same as the direction of polarization (direction from the second electrode 25 toward the first electrode 24) is generated in an area, of the second bending detection section 22, between the first electrode 24 and the second electrode 25, and a negative electric potential is generated in the first electrode 24. Upon receiving this signal, the display control section 32 makes a judgment that the substrate 20 is bent to form a projection upward, around the axis C1, and the display control section 32 displays on the display 13 an enlarged image in which a central portion of the image being displayed currently is enlarged.

In other words, when the substrate 20 is bent to form a projection toward a rearward side (downward) when viewed from the user such that the substrate 20 moves away from the user, the display control section 32 zooms out the image displayed on the display 13. On the other hand, when the substrate 20 is bent to form a projection toward a frontward side (upward) when viewed from the user such that the substrate 20 moves closer to the user, the display control section 32 enlarges the image displayed on the display 13. In this manner, since a bending operation of bringing the substrate 20 closer to the user corresponds to the enlargement of the image, and a bending operation of bringing the substrate 20 away from the user corresponds to the reduction of the image, there is an advantage that it is easy for the user to memorize instinctively the bending operation of the substrate 20 at the time of enlarging and reducing the image.

Here, the image data of the image to be displayed on the display 13 (also called as 'display image data') is not required to be same as the image data of the image-data storage section 31 which is input from the data recording medium 7 (also called as 'original image data'). For example, when the original image data is image data of high resolution for printing, it is possible to create display image data as image data in which resolution of the original image data is lowered. As it has been described above, when the user has given an instruction for enlargement or reduction of the image data which is displayed, image data of an enlarged image or a reduced image may be formed to display based on the display image data. Alternatively, the image data of the enlarged image or the reduced image may be formed to display based on the original image data whenever there is an instruction from the user. As it will be described later, when it is possible to print an enlarged image and a reduced image, it is necessary to form image data for printing corresponding to the enlarged image and the reduced image which is subjected to printing. In this case, whenever there is an instruction from the user for the enlargement (reduction) of the image, display image data and the image data for printing of the corresponding enlarged image (reduced image) may be formed. Or, when there has been an instruction from the user for the enlargement (reduction) of the image, the display image data of the corresponding enlarged (reduced) image may be formed, and when there is an instruction for printing from the user, the image data for printing corresponding to an image which is displayed at that time may be formed.

Image Switching (Forwarding/Returning of Image)

As shown in FIG. 6, when the substrate 20 in the form of a rectangular sheet is bent by the user to form a projection downward (rearward side as viewed from the user), around the axis C2 parallel to the longitudinal direction of the substrate 20, the lower surface portion of the piezoelectric layer 23 is elongated in the short-side direction of the substrate 20. Here, when the substrate 20 is bent at a comparatively slow speed to form a projection downward (item C in FIGS. 8A and 8B), a weak electric field in the direction opposite to the direction of polarization of the piezoelectric layer 23 (direction from the first electrode 24 toward the second electrode 25) is generated in an area, of the first bending detection section 21, between the first electrode 24 and the second electrode 25, and a comparatively small positive electric potential having an absolute value not higher than a predetermined value is generated in the first electrode 24 of the first bending detection section 21.

Upon receiving this signal, the display control section 32 makes a judgment that the substrate 20 is bent to form a projection downward at a slow speed, around the axis C1. Moreover, the display control section 32 selects an image data subsequent to the image data which is currently displayed on the display 13, among the plurality of the ordered image data stored in the image-data storage section 31, and switches the image to be displayed on the display 13 to the image of the selected image data.

Moreover, as shown in FIG. 7, when the substrate 20 in the form of a rectangular sheet is bent by the user to form a projection upward (frontward side when viewed from 8by) the user), around the axis C2 parallel to the longitudinal direction of the substrate 20, the lower surface portion of the piezoelectric layer 23 is contracted in the short-side direction of the substrate 20. Here, when the substrate 20 is bent at a comparatively slow speed to form a projection upward (item D in FIGS. 8A and 8B), a weak electric field in the direction same as the direction of polarization of the piezoelectric layer 23 (direction from the second electrode 25 toward the first electrode 24) is generated in an area, of the first bending detection section 21, between the first electrode 24 and the second electrode 25, and a comparatively small negative electric potential having an absolute value not higher than a predetermined value is generated in the first electrode 24 of the first bending detection section 21.

Upon receiving this signal, the display control section 32 makes a judgment that the substrate 20 is bent to form a projection upward at a slow speed, around the axis C2. At this time, the display control section 32 selects image data previous to image data which is currently displayed on the display 13, among the plurality of the sorted image data stored in the image-data storage section 31, and switches the image to be displayed on the display 13 to an image of the selected image data.

Furthermore, in FIGS. 6 and 7, higher bending speed when the substrate 20 is bent to form a projection downward or upward, larger (wider) is the electric field generated in the piezoelectric layer 23 between the first electrode 24 and the second electrode 25 of the first bending detection section 21, and higher is the absolute value of the electric potential of the first electrode 24. Therefore, when the absolute value of the electric potential of the first electrode 24 is higher than the predetermined value, the display control section 32 makes a judgment that the substrate 20 has been bent at a considerably (substantially) high speed (items E and F in FIGS. 8A and 8B). In this case, the display control section 32 forwards and returns the display image on the display 13, at a even longer interval than in the earlier process (items C and D in FIGS. 8A and 8B).

For example, the display control section 32 has made a judgment that the substrate 20 has been bent to form a projection downward at a considerably (substantially) high speed, the display control section 32 switches the image to be displayed on the display 13 to an image after five images of the image being currently displayed. Conversely, when the display control section 32 has made a judgment that the substrate 20 has been bent to form a projection upward at a considerably (substantially) high speed, the display image control section 32 switches the image to be displayed on the display 13 to an image before five image of the image being currently displayed.

In other words, when the user is aware that the displayed image is substantially far sequentially from the desired image to be displayed, the user is capable of forwarding or returning five images at a time such that the image to be displayed on the display 13 becomes closer to the desired image in a short time, by bending the substrate 20 at a high speed. Thereafter, as the displayed image comes closer to the desired image, then it is possible to forward or return one image at a time while checking whether the image displayed is the desired image, by bending the substrate 20 at a slow speed. In this case, the number of images skipped at once in the high-speed bending operation as described above is not limited to five and may be determined arbitrary.

As it has been described above, when a command to record the image is input by the operation button 12 (refer to FIG. 1) being operated by the user after the desired image is displayed on the display 13, the recording control section 30 controls the recording head 2 and the transporting mechanism 3 to record the image displayed currently on the display 13 on the printing paper P.

According to the printer 1 of the first embodiment described above, the following effect is achieved. When the user generates a bending deformation in the substrate 20 in the form of a flexible sheet as bending a paper, the bending deformation of the substrate 20 is detected by the first bending detection section 21 and the second bending detection section 22, and further, based on the detected bending deformation, the image to be displayed on the display 13 is changed by the display control section 32. According to this arrangement, it is possible to carry out enlargement and reduction of image and switching (changing) of image (forwarding/returning) only by a simple operation of bending the substrate 20. Consequently, for changing the image to be displayed on the display 13, complication operation of the operation buttons 12 is not necessary, a user who is not good at operation of equipment is capable of changing easily the image to be displayed on the display 13.

Moreover, the display 13 as a whole has flexibility, and furthermore, the display 13 is provided integrally to the substrate 20, to be deformable by bending. Therefore, the user is able to change the image to be displayed on the display 13 by deforming by bending the substrate 20 positioned at a rear side of the display 13, while looking at the image being displayed on the display 13.

Next, modified embodiments in which various modifications are made in the first embodiment will be described below. However, same reference numerals are assigned to components having a similar structure as in the first embodiment, and description of such components is omitted.

A structure and a position of the bending detection section which detects the bending deformation of the substrate, and the number of bending detection sections is restricted to those described in the first embodiment, and it is possible to make the following changes.

First Modified Embodiment

Figure 9:
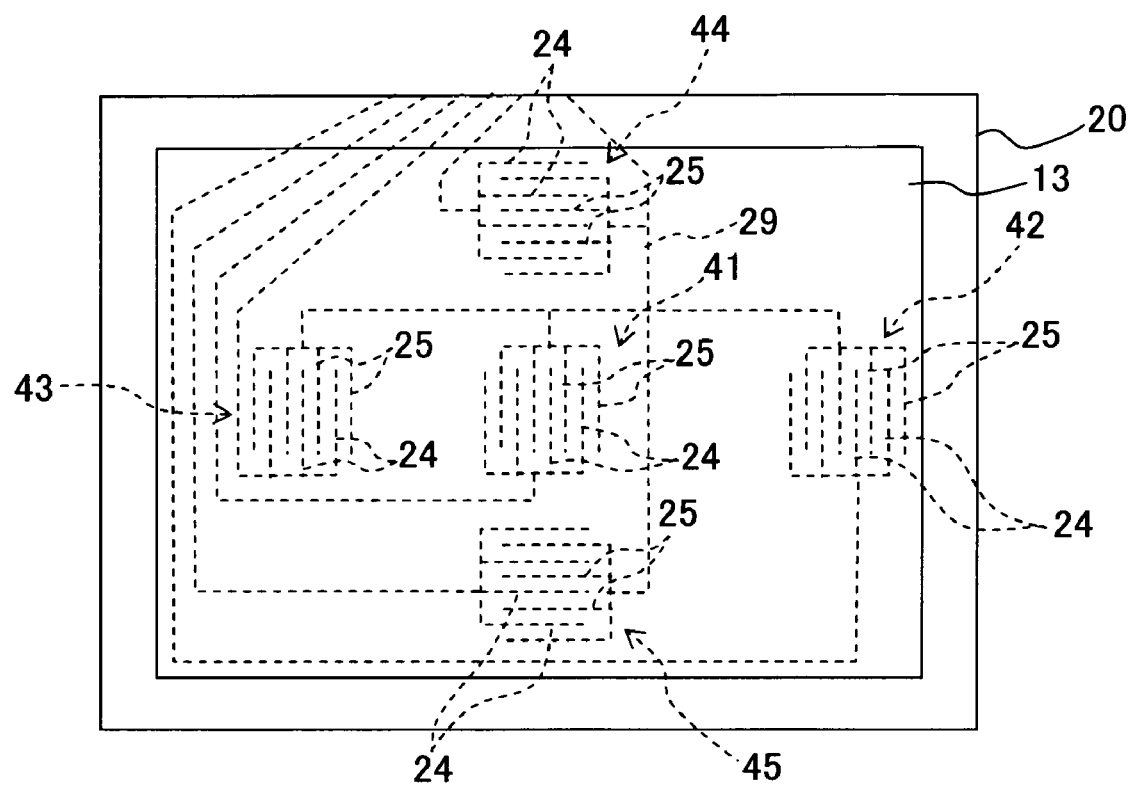
FIG. 9 is a plan view of an input unit of a first modified embodiment.

As shown in FIG. 9, five bending detection sections 41 to 45 may be provided at five locations namely, a central portions of the substrate 20, and four sides around the central portion of the substrate 20. In the first modified embodiment, out of the five bending detection sections 41 to 45, in the three bending detection sections 41, 42, and 43 aligned in the horizontal direction (the left-right direction) at the center in the vertical direction, the direction of extension of the first electrode 24 and the second electrode 25 are parallel to the short-side direction of the substrate 20. On the other hand, in the two bending detection sections 44 and 45 provided at the upper and lower sides respectively, the direction of extension of the first electrode 24 and the second electrode 25 are parallel to the longitudinal direction of the substrate 20. Moreover, independent wires are drawn from the first electrodes 24 of the five bending detection sections 41 to 45, whereas, a common wire 29 is drawn from the second electrodes 25 of the five bending detection sections 41 to 45.

Consequently, a bending deformation of the substrate 20 around an axis parallel to the short-side direction of the substrate is detected by the three bending detections sections 41 to 43 arranged at the central portion in the vertical direction of the substrate 20, and a bending deformation of the substrate 20 around an axis parallel to the longitudinal direction of the substrate is detected by the two bending detections sections 44 and 45 arranged at upper and lower position.

Furthermore, since each of the five bending detection sections 41 to 45 are arranged in different area on the surface of the substrate 20, it is possible to detect the bending deformation occurred locally in a part of the substrate 20 when only the part of the substrate 20 is bent by the user. For example, when a right end portion of the substrate 20 is bend around the axis parallel to the short-side direction of the substrate 20, the bending detection occurred locally in this right end portion is detected by the bending detection section 42 at a right side. In this manner, it is possible to detect not only a bending direction but also a bending position when the substrate is bent locally. In other words, as compared to the abovementioned first embodiment, since it is possible to detect more distinctly the mode of the bending deformation of the substrate 20, it is possible to allocate a multiple number of processes for the mode of bending deformation which is detected distinctly.

An example of allocation of the process will be described with reference to FIGS. 10A and 10B. In FIG. 10A, the 'bending position' indicates a position at which the substrate 20 is bent by the user. In FIGS. 10A and 10B, when a part of the substrate 20 is bent locally, the display control section 32 enlarges or reduces an image displayed on the display 13, with a portion of the substrate 20 corresponding to an area in which the bending detection sections 41 to 45 which detect the bending deformation of the substrate 20 are arranged, as a center.

For example, as it is indicated in item C in FIGS. 10A and 10B, with a certain image being displayed on the display 13, when the right end portion of the substrate 20 is bent by the user to form a projection downward (rearward side), only the first electrode 24 of the detection bending section 42 provided on the right end portion of the substrate 20 is at a positive electric potential. On the other hand, an electric potential of the first electrodes 24 of the other bending detection sections 41, 43, 44, and 45 are kept at the ground electric potential. Consequently, the display control section 32, upon receiving signals output from the bending detection sections 41 to 45, is capable of identifying that the right end portion of the substrate 20 has been bent locally to form a projection downward. At this time, when the image being displayed on the display 13 is an image in a standard state (image in a state of not enlarged), the display control section 32 controls the display 13 to display an enlarged image which has been enlarged with the right end portion of the image as a center. The right end portion of the image corresponds to an area in which the bending detection section 42 is arranged. Moreover, when the image being displayed currently on the display 13 is an enlarged image, in which a part of the image has already been enlarged, the display control section 32 changes a position of enlargement (a center of the enlargement) to the right end portion (in other words, changes the display image on the display 13 to an image in which the right end portion is enlarged).

Whereas, as it is indicated in item D in FIGS. 10A and 10B, when the right end portion of the substrate is bent by the user to form a projection upward (frontward side), only the first electrode 24 of the bending detection section 42 provided to the right end portion of the substrate 20 is at a negative electric potential, and the electric potential of the first electrodes 24 of the bending detection sections 41, 43, 44, and 45 are kept at the ground electric potential. Consequently, the display control section 32, upon receiving signals output from the bending detection sections 41 to 45, is capable of identifying that the right end portion of the substrate 20 has been bent locally to form a projection upward. At this time, the display control section 32 displays on the display 31 an image which has been reduced with the right end portion of the image as a center, corresponding to the area in which the bending detection section 42 is arranged.

When each of the central portion, the left end portion, the upper end portion, and the lower end portion of the substrate is bent to form a projection downward or upward, the enlargement or the reduction of the image is carried out with the portion corresponding to the bending position of the substrate 20 as a center, similarly as in the abovementioned case in which the right end portion of the substrate 20 is bent.

In this manner, in the allocation shown in FIGS. 10A and 10B, when the substrate 20 is bent locally in an area in which one of the five bending detection sections 41 to 45 is provided, the user can specify the center of the enlargement or the reduction of the image displayed on the display 13.

When it is detected that the bending detection sections 42 to 45 have been bent to form a projection upward, instead of displaying an enlarged image which is further enlarged with each of a right side, a left side, an upper side, and a lower side of the image as a center, the image may be moved toward the right side, the left side, the upper side, and the lower side. Such an operation is useful in a case in which image data such as a map is stored in the image-data storage section 31, and a part of image data is subjected to an enlarged display on the display 13. When the control unit 4 is provided with a GPS receiving set (receiver), it is also possible to display on the display 13, an enlarged map with the current position as a center. In such case, for instance, by bending an upper end portion of the substrate 20, it is possible to move upward a range of the map which is being displayed on the display 13, the user is capable of moving immediately (intuitively) the range of the map which is displayed on the display 13. The image to be displayed on the display 13 is not limited (restricted) to the image of the map, and it is possible to carry out the same operation even for an arbitrary image.

Second Modified Embodiment

Figure 11:
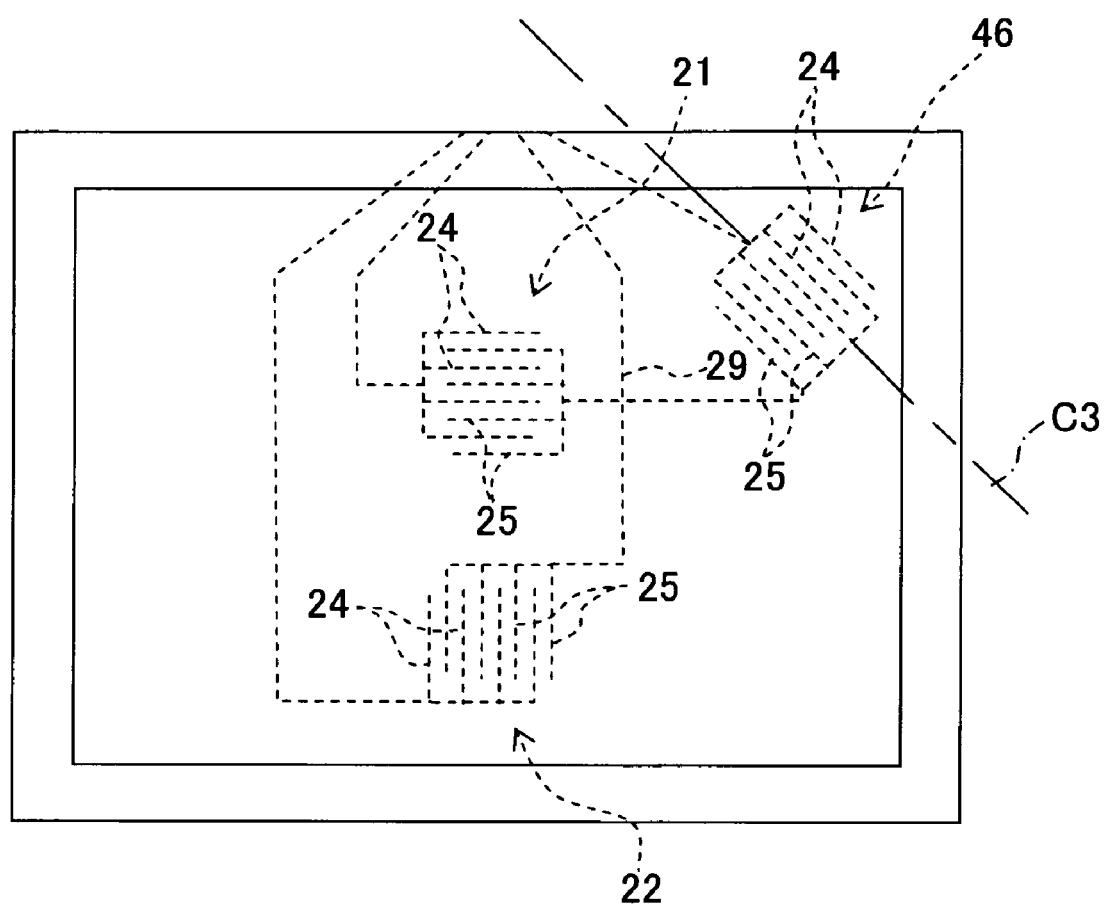
FIG. 11 is a plan view of an input unit of a second modified embodiment.

As shown in FIG. 11, a bending detection section (third bending detection section 46) may be provided in an area at an upper-right corner portion of the rectangular shaped substrate 20, and a bending deformation of the upper-right corner portion of the substrate 20 may be detected by the third bending detection section 46. The direction of extension of the first electrode 24 and the second electrode 25 of the third bending detection section 46 is a direction inclined at 45° in a clockwise direction with respect to the longitudinal direction of the substrate 20 (direction of extension of electrodes of the first bending detection section 21), and 45° in a counterclockwise direction with respect to the short-side direction of the substrate 20 (direction of extension of electrodes of the second bending detection section 22). Moreover, a wire independent of the first bending detection section 21 and the second bending detection section 22 is drawn from the first electrode 24 of the third bending detections section 46. On the other hand, the second electrode 25 of the third bending detection section 46 is connected to the wire 29 in common to the second electrode 25 of the first bending detection section 21 and the second bending detection section 22.

In case the third bending detection section 46 is provided at the upper-right corner of the substrate 20, when the upper-right corner portion of the substrate 20 is bent downward (rearward side) or upward (frontward side), an electric potential of the first electrode 24 of the third bending detection section 46 becomes a positive electric potential or a negative electric potential. Therefore, the display control section 32 is capable of identifying that the upper-right portion of the substrate 20 has been bent.

Furthermore, in the second modified embodiment, as shown in FIGS. 12A and 12B, the bending deformation of the upper-right corner portion of the substrate 20 which is detected by the third bending detection section 46 is assumed to be a deformation of a mode different from the bending deformation for changing the image to be displayed on the display 13. Therefore, a process different from the image changing process described above can be allocated for this bending deformation of the upper-right corner portion.

In FIGS. 12A and 12B, since the image changing process from items A to F is similar to the image changing process in FIGS. 8A and 8B of the first embodiment, the description thereof is omitted. However, as shown in item G in FIGS. 12A and 12B, when the upper-right corner portion of the substrate 20 is bent to form a projection downward (rearward side) around an axis C3 and the first electrode 24 of the third bending detection section 46 is at the positive electric potential, a judgment is made that the bending deformation occurred in the substrate 20 is not a bending deformation aiming for changing the image to be displayed on the display 13, but is a bending deformation aiming for image recording. Then the recording control section 30 controls the recording head 2 to record the displayed image on the printing paper P. Moreover, as it has been described above, after an instruction for recording the image is made, as shown in item H in FIGS. 12A and 12B, when the upper-right corner portion of the substrate 20 is bent to form a projection upward (frontward side) and the first electrode 24 of the third bending detection section 46 is at the negative electric potential, the recording control section 30 makes the recording head 2 stop (cancel) the recording of image.

In the second modified embodiment, it is possible to make the recording head 2 print on the recording paper P an image displayed on the display 13, by causing in the substrate 20 a bending deformation different from a case of changing the image to be displayed on the display 13. Consequently, for giving an instruction for recording an image, the user is not required to operate an operating section (operation buttons 12 shown in FIG. 1) other than the input unit 14. Moreover, by bending the upper-right corner portion of the substrate 20 in the same manner as bending an edge of a paper for selecting a predetermined page of a book or a booklet, it is possible to record an image upon selecting that image being displayed currently on the display 13 or to cancel a recording command which has been made once. Therefore, it is easy memorize instinctively the bending operation of the substrate 20 at the time of recording an image.

Third Modified Embodiment

Figure 13A:
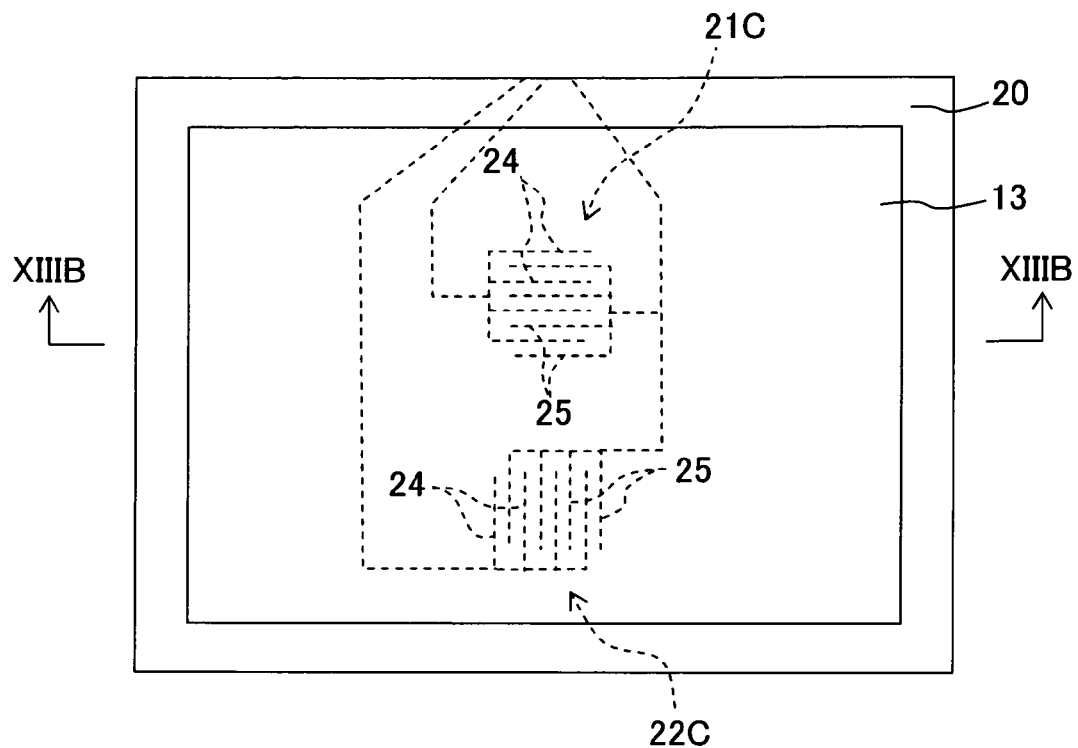
FIG. 13A and FIG. 13B are diagrams showing an input unit of a third modified embodiment, where.
Figure 13B:
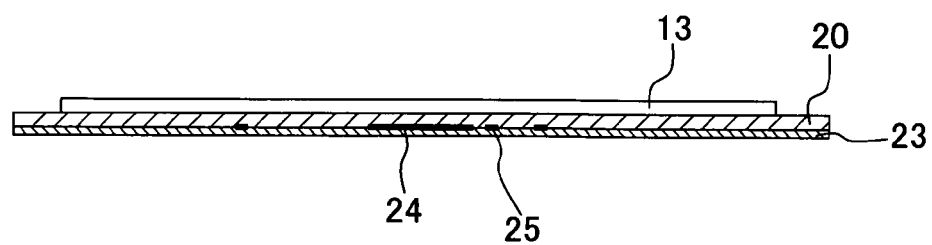

In the first embodiment described above, the first electrode and the second electrode of the bending detection section are arranged on a surface of the piezoelectric layer, at an opposite side of the substrate. However, as shown in FIG. 13, the first electrode 24 and the second electrode 25 of bending detection sections 21C and 22C (a first bending detection section 21C and a second bending detection section 22C) may be formed on the surface of the substrate 23, on the side of the substrate 20. However, in this case, it is necessary that at least a lower surface of the substrate 20 has insulating property, by the substrate 20 being formed of an insulating material so that the first electrode 24 is electrically isolated from the second electrode 25. Moreover, in the third modified embodiment, the insulating layer 26 on the rear surface of the piezoelectric layer 23 (refer to FIG. 3B) which has been necessary for covering the first electrode 24 and the second electrode 25 in the other embodiments described above is not necessary.

Fourth Modified Embodiment

The bending detection section may be a section having two types of electrodes arranged face-to-face sandwiching the piezoelectric layer 23. For example, in an input unit shown in FIG. 14, the substrate 20 is a thin plate made of a metallic material, and the substrate 20 also serves as a common electrode connected to one surface of the piezoelectric layer 23. Whereas, two electrodes 24D having a rectangular shape in a plan view, facing the substrate 20 as the common electrode are arranged on a surface (lower surface) of the piezoelectric layer 23, on the opposite side of the substrate 20. One bending detection section 21D (22D) includes one electrode 24D and the substrate 20 as the common electrode, and the piezoelectric layer 23 sandwiched between the electrode 24D and the substrate 20. Moreover, the substrate 20 as the common electrode is kept at the ground electric potential.

In the fourth modified embodiment, when the bending deformation occurs in the substrate 20, and there is a distortion in a portion of the piezoelectric layer 23, sandwiched between the electrode 24 arranged on the lower surface and the substrate 20 as the common electrode on the upper surface, an electric field according to the distortion is generated between the electrode 24D and the substrate 20. Accordingly, since a positive electric potential or a negative electric potential is generated in the electrode 24D, it is possible to detect the bending deformation of the substrate 20.

Figure 14A:
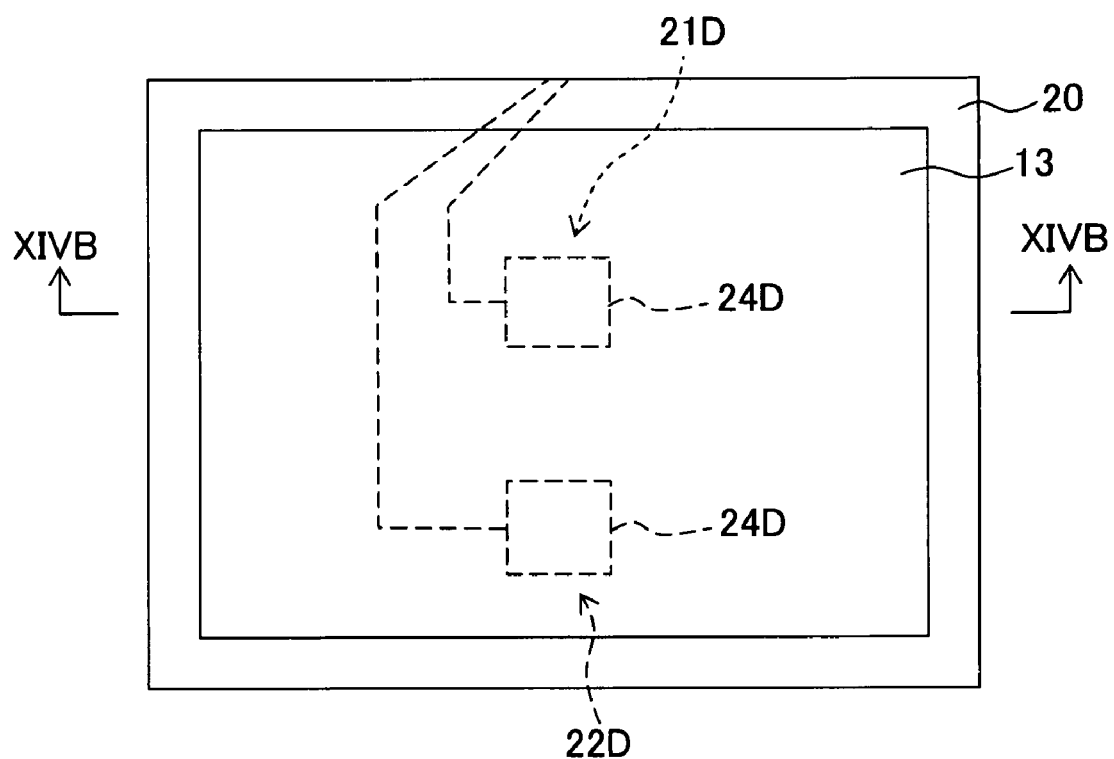
FIG. 14A and FIG. 14B are diagrams showing an input unit of a fourth modified embodiment, where.
Figure 14B:
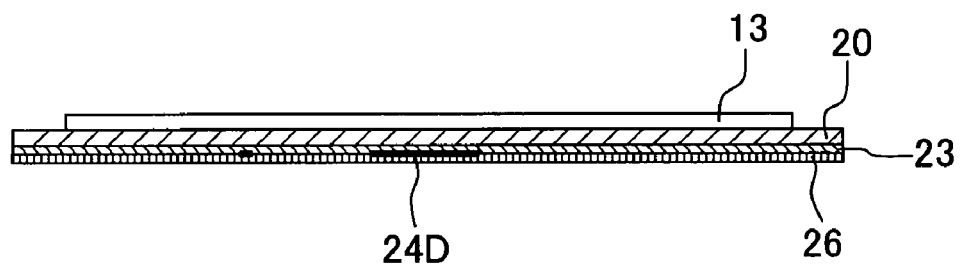

In an example in abovementioned FIG. 14, the substrate 20 made of a metallic material also serves as the electrode facing the electrode 24D sandwiching the piezoelectric layer 23. However, the substrate 20 is not particularly required to serve also as one of the pair of electrodes sandwiching the piezoelectric layer 23, and an electrode separate (different) from the substrate 20 may be arranged on the surface of the piezoelectric layer 23 on the side of the substrate 20.

Fifth Modified Embodiment

Figure 15A:
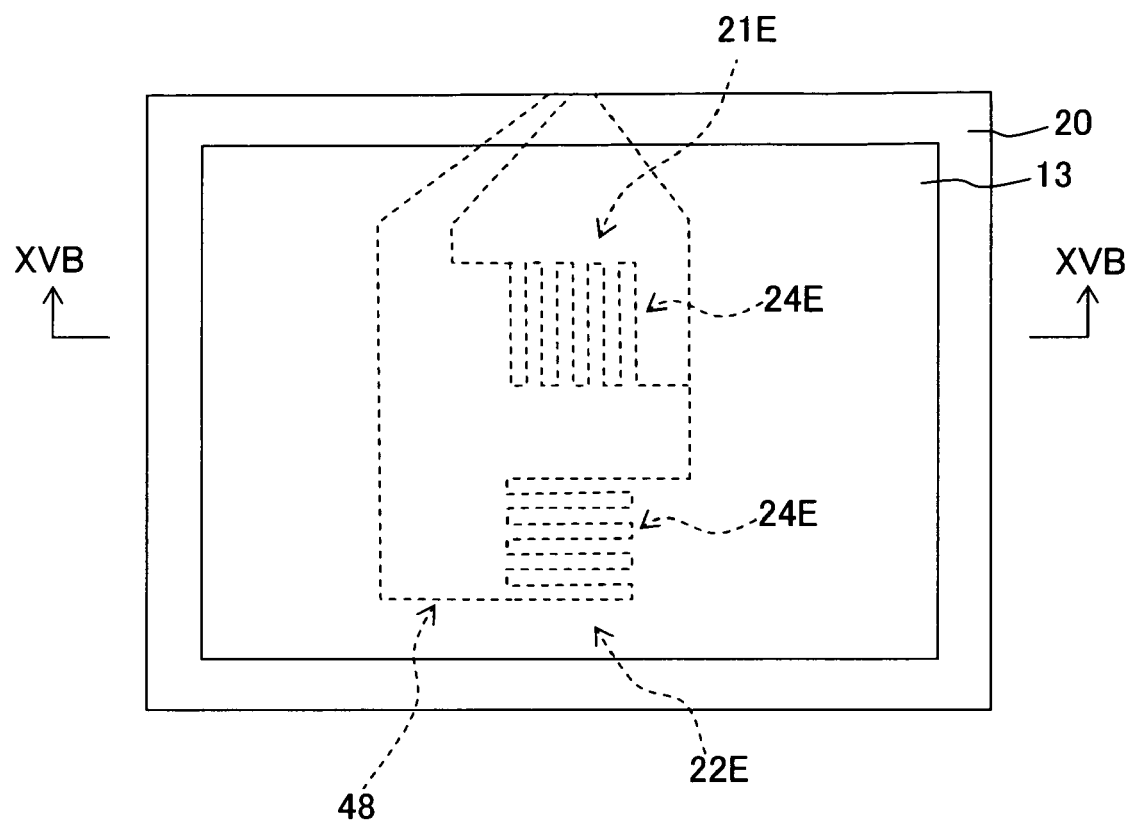
FIG. 15A and FIG. 15B are diagrams showing an input unit of a fifth modified embodiment, where.
Figure 15B:
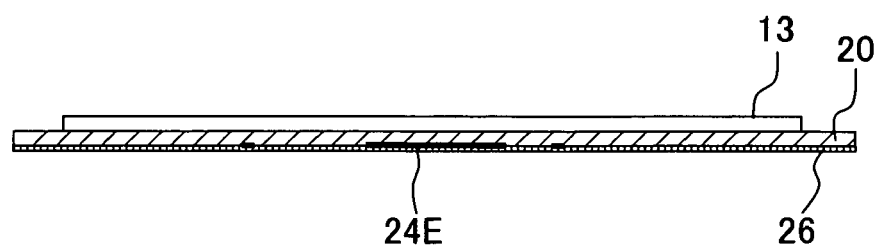

The bending detection section is not restricted to a section in which an electromechanical conversion effect of a piezoelectric element is used. For example, as shown in FIG. 15, bending detection electrodes 21E and 22E (a first bending detection electrode 21E and a second bending detection electrode 22E) may be electrodes which are made of an electroconductive material arranged on the surface of the substrate 20, and which have an electrical resistor 48 of which an electric resistance changes according to the bending deformation of the substrate 20 (so called distortion gauge).

At least the surface of the substrate 20 has an insulating property. For example, the substrate may be formed of a resin material having the insulating property. The electrical resistors 48 having meandering sections (portions) 24E at two locations connected in parallel are arranged on the rear surface (lower surface) of the insulating substrate 20. The two meandering sections 24E are meandered in different directions, and in the meandering section 24E positioned at an upper-middle side in FIG. 15A, the electrical resistor 48 is meandered parallel to the short-side direction of the substrate 20, and in the meandering section 24E positioned at a lower side, the electrical resistor 48 is meandered parallel to the longitudinal direction of the substrate 20. These two meandering sections 24 form the two bending detections sections 21E and 22E (the first bending detection section 21E and the second bending detection section 22E). Moreover, the insulating layer 26 is provided on the lower surface of the substrate 20, to cover the electrical resistor 48 completely.

When a bending deformation around an axis orthogonal to the direction of meandering of the meandering section 24E occurs in the substrate 20, and the electrical resistor 48 is elongated or contracted in the meandering section 24E, an electrical resistance of the meandering section 24E changes. Accordingly, the bending deformation of the substrate 20 is detected. For example, when a bending deformation around the axis C1 parallel to the short-side direction of the substrate 20 has occurred in the substrate 20, in the meandering section 24 meandering along the longitudinal direction of the substrate 20 positioned at a lower side in FIG. 15A, since the electrical resistor 48 is elongated or contracted substantially together with the substrate 20, the electrical resistance thereof changes.

Sixth Modified Embodiment

Figure 16A:
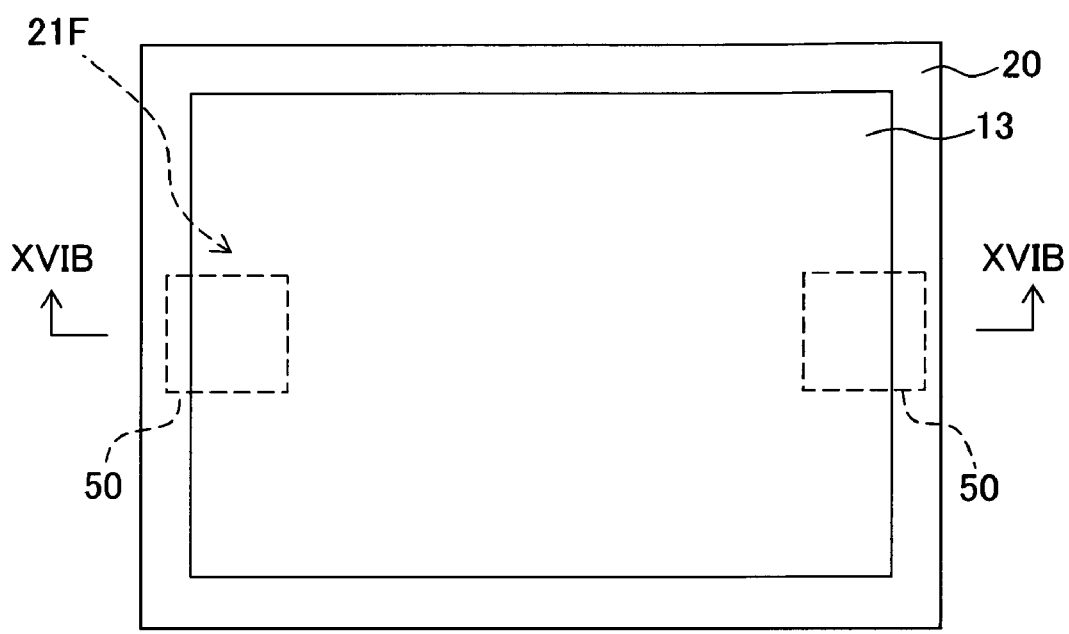
FIG. 16A and FIG. 16B are diagrams showing an input unit of a sixth modified embodiment, where.
Figure 16B:
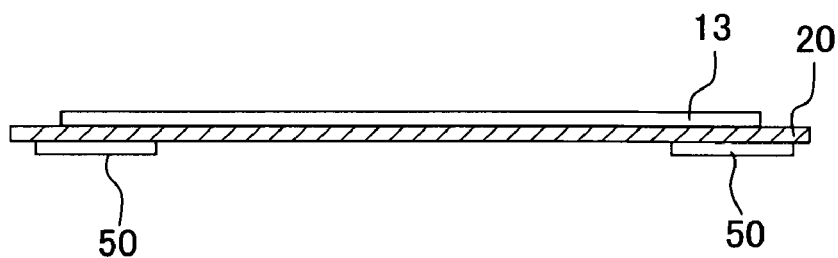

As shown in FIG. 16, a bending detection section 21F may have two acceleration sensors 50 arranged at two locations (concretely, a left end portion and a right end portion) on the surface (lower surface) of the substrate 20. In this manner, it is possible to detect independently a movement (change of position) at two locations of the substrate 20 by the two acceleration sensors 50 provided at two different positions of the substrate 20. Therefore, it is possible to detect the bending deformation of the substrate 20, based on the position change at these two locations.

Seventh Modified Embodiment

In the first embodiment and the modified embodiments thereof, the process of enlargement and reduction of the image, and the process of changing the image are allocated as the image changing process to be carried out by the display control section 32 for various modes of bending deformation of the substrate 20 which have been detected by the bending detection section. However, it is possible to allocate the processes other than the abovementioned processes for the bending deformation of the substrate 20 which has been detected.

Figure 17A:
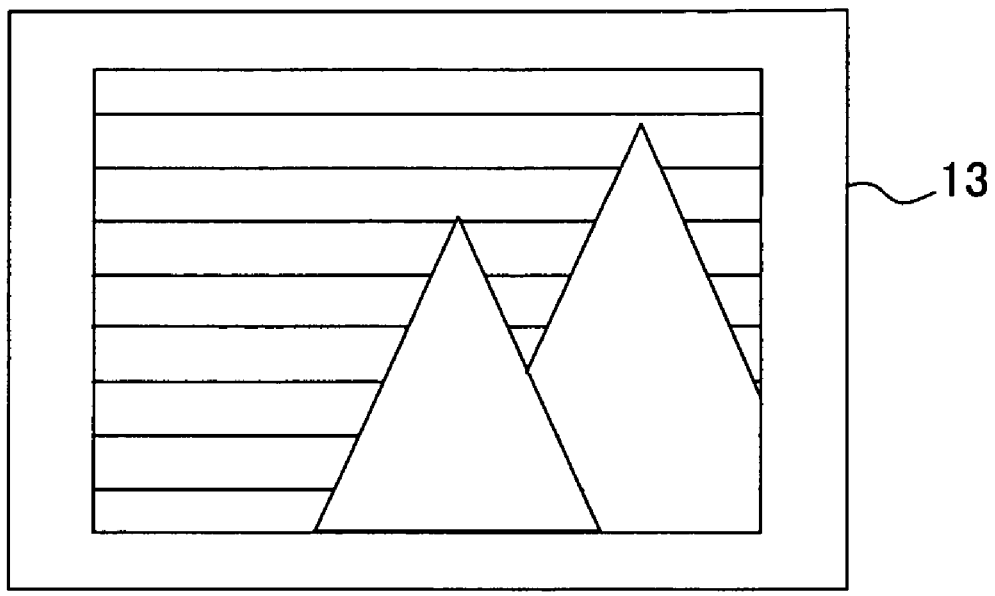
FIGS. 17A and 17B are diagrams describing about a change in the number of image displays of a display.
Figure 17B:
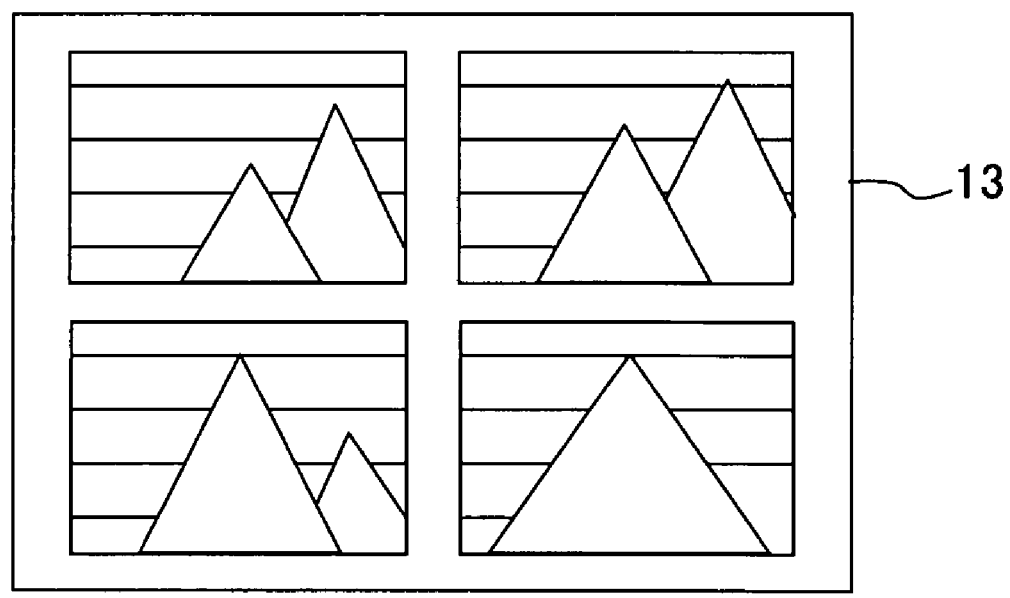

For example, normally, the display control section 32 which controls the display 13 is capable of controlling the display 13 to display one image as shown in FIG. 17A. However, as shown in FIG. 17B, the display control section 32 is also capable of controlling the display 13 to display a list of reduced images (thumbnail images) of a plurality of images (such as four). Therefore, when the bending deformation of the substrate 20 has been detected by the bending detections section, the display control section 32 may change the number of images to be displayed as a list on the display 13.

The allocation of the image changing process in the seventh modified embodiment will be described below by citing an example of a case in which the input unit in the abovementioned first embodiment (refer to FIG. 9) in which five bending detections sections 41 to 45 are provided to the substrate 20 is adopted. As it has been mentioned in the description of the first modified embodiment, in the input unit in FIG. 9, the bending deformation at each five locations namely, the central portion, the right end portion, the left end portion, the upper end portion, and the lower end portion of the substrate 20 is detectable independently by each of the five bending detection sections 41 to 45 respectively. The contents of the image changing process allocated to the bending deformation of the substrate 20 detected by the five bending detection sections 41 to 45 are shown in FIGS. 18A and 18B.

When the central portion of the substrate 20 is bent by the user to form a projection downward (rearward side) (item A in FIGS. 18A and 18B), the display control section 32 increases the number of images displayed as a list on the display 13. Moreover, when the central portion of the substrate 20 is bent by the user to form a projection upward (frontward side) (item B in FIGS. 18A and 18B), the display control section 32 reduces (decreases) the number of image displayed as a list on the display 13. For example, when the substrate 20 is bent to form a projection downward, the state of the display 13 is changed from the standard display state in which one image is displayed entirely as shown in FIG. 17A, to another state in which four reduced images (thumbnail images) are displayed as shown in FIG. 17B. Moreover, conversely, when the substrate 20 is bent to form a projection upward, the state of the display is changed from the thumbnail image display state in FIG. 17B to the standard display state in FIG. 17A. Moreover, when the four thumbnail images are displayed on the display and the substrate 20 is bent to form a projection downward to increase the number of images further, the number of thumbnail images to be displayed as a list is increased further from four images (for example, eight images).

Moreover, when the plurality of images (thumbnail images) are displayed as a list on the display 13 and when the right end portion of the substrate 20 is bent to form a projection downward (item C in FIGS. 18A and 18B), the display control section 32, among the plurality of images displayed as a list on the display 13, selects newly an image positioned at right (side) of the image which has been selected currently. In other words, the display control section 32 changes the image selected to the image on the right side. "The image has been selected" indicates a state that the selected image is distinguished from the other images displayed as a list on the display 13 by surrounding the selected image by a thick frame, or making the selected image brighter, or making the selected image blink.

Moreover, when each of the left end portion, the upper end portion, and the lower end portion of the substrate 20 are bent, an image positioned at the left (side), the upper side, and the lower side with respect to the image which has been selected currently, is selected among the plurality of images displayed as a list on the display 13 (items D, E, and F in FIGS. 18A and 18B).

Thereafter, when an instruction is given for the recording of the image which has been selected currently by operating the operation buttons 12 (refer to FIG. 1) by the user, the recording control section 30 makes the recording head record the image selected on the printing paper P.

Apart from the processes such as changing the number of images displayed as a list, it is also possible to allocate various processes such as a rotation, a shade, a hue, or a contrast of the displayed image, for the bending deformation of the substrate.

Second Embodiment

Figure 19:
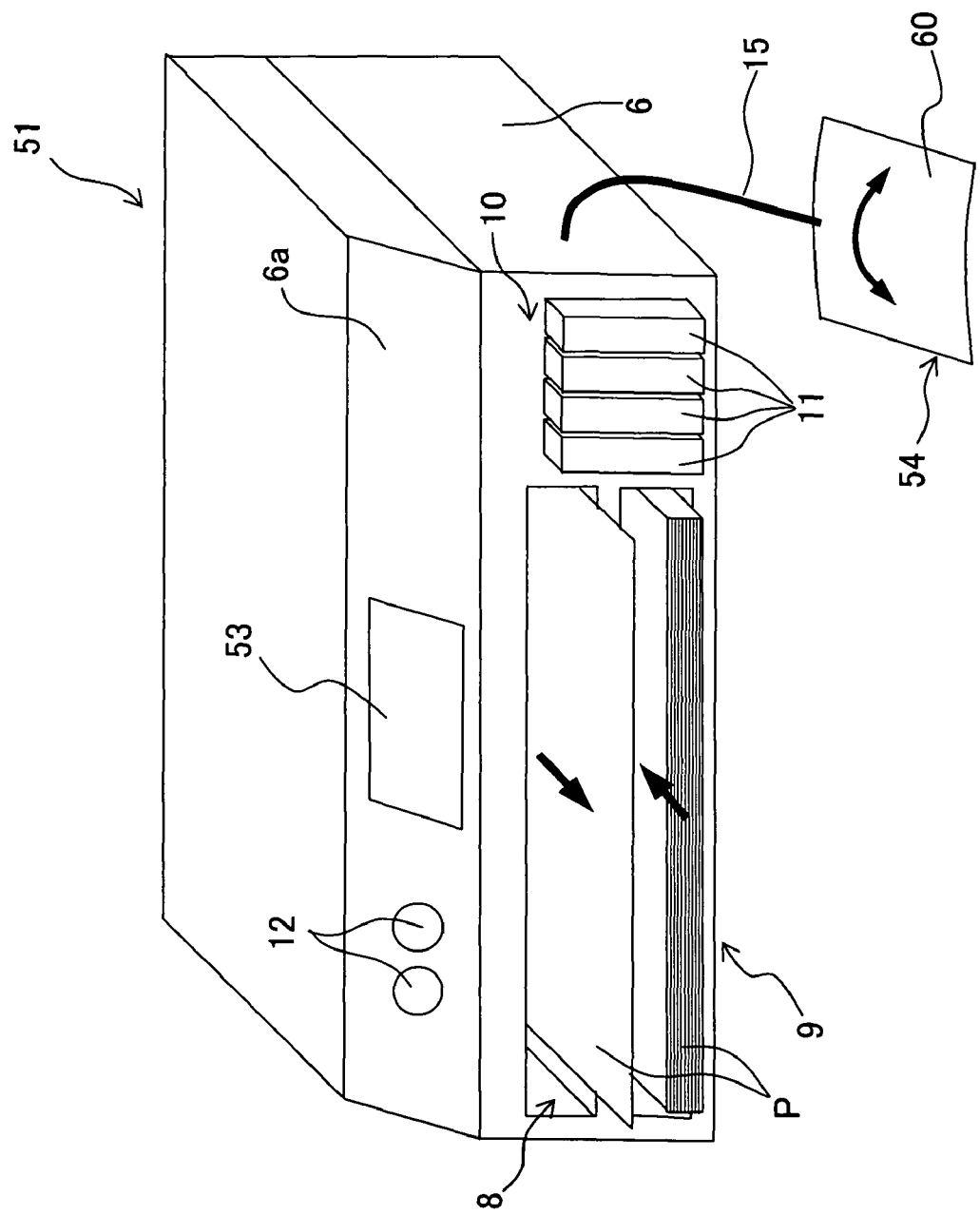
FIG. 19 is a schematic perspective view of a printer according to a second embodiment.
Figure 20:
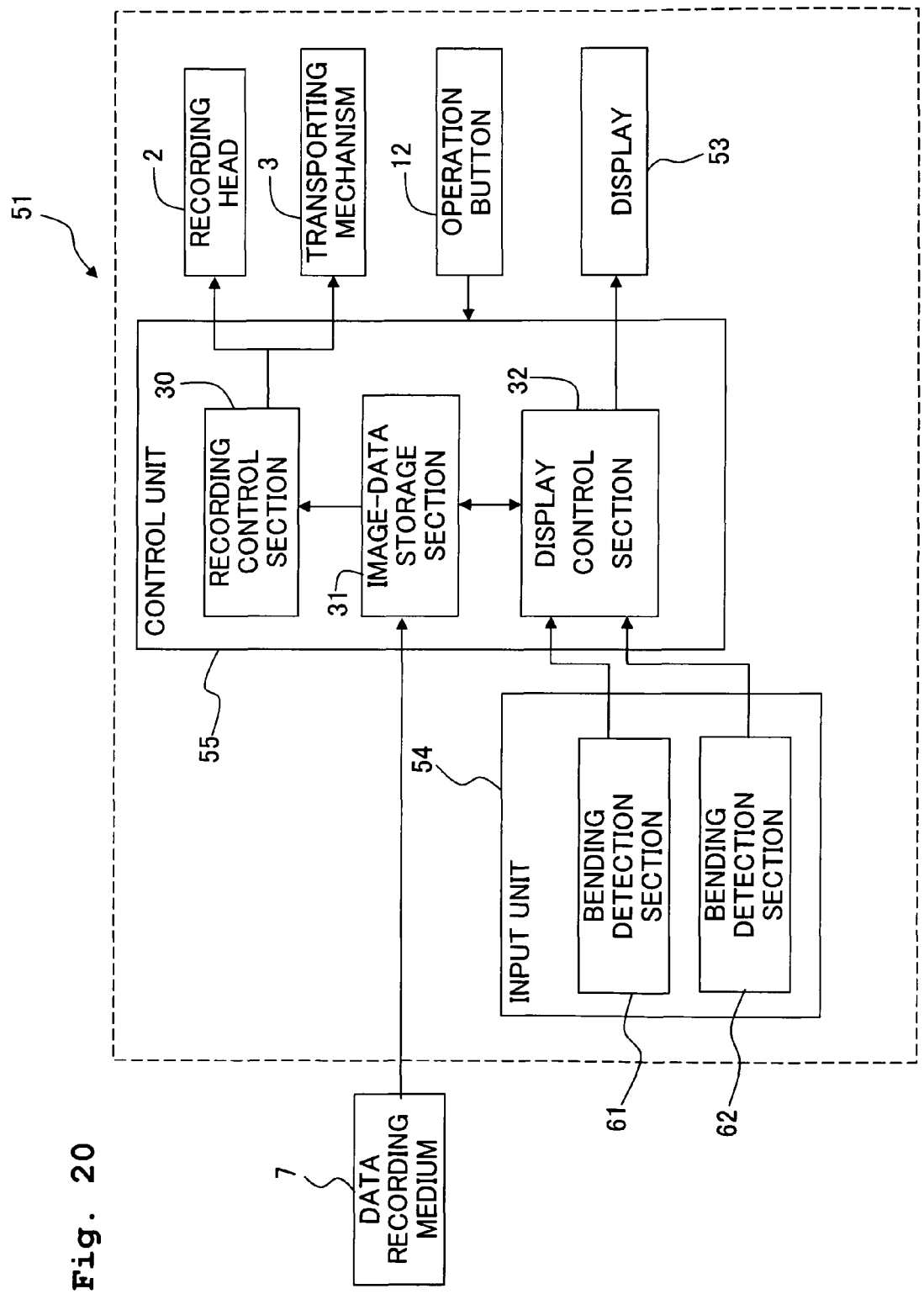
FIG. 20 is a block diagram showing schematically an electrical structure of the printer of the second embodiment.

Next, a second embodiment of the present invention will be described below. FIG. 19 is a perspective view of a printer of the second embodiment, and FIG. 20 is a block diagram showing schematically an electrical structure of the printer. As shown in FIG. 19, similarly as in the first embodiment, in the second embodiment also, an input unit 54 including a substrate 60 having flexibility, and bending detection sections 61 and 62 (a first bending detection section 61 and a second bending detection section 62) which detect the bending deformation of the substrate 60, is connected to a control unit 55 which is accommodated in the printer-body 6 via the cable 15. However, the second embodiment differs from the first embodiment at a point that a display 53 which displays an image is not provided to the substrate 60 of the input unit 54, but is provided on the inclined surface 6a formed at the upper portion of the printer-body 6, together with the plurality of operation buttons 12.

Even in the second embodiment, when the substrate 60 is bent by the user, the input unit 54 detects the bending deformation occurring in the substrate 60 by the two bending detection sections 61 and 62 (the first bending detection section 61 and the second bending detection section 62). The display control section 32 of the control unit 55 which controls the display 53 to change an image to be displayed on the display 53 based on the bending deformation of the substrate 60 which has been detected by the bending detections sections 61 and 62 (the first bending detection section 61 and the second bending detections section 62). These characteristics (peculiarities) are similar to (the characteristics in) the first embodiment, and the further description thereof is omitted.

In this manner, when the display 53 is provided separately from the substrate 60 of the input unit 54, the structure of the input unit 54 becomes simple. Moreover, unlike in a case in which the display 53 is provided integrally with the substrate 60 as in the structure in the first embodiment, since the display 53 is not particularly required to be flexible, a case of an image becoming difficult to see due to the bending of the display 53 does not arise.

Incidentally, when the display 53 and the substrate 60 of the input unit 54 are separated, and when the user holds the input unit 54 in hand, as to whether the current posture (attitude) of the substrate 60 is a regular posture (attitude) corresponding to the image on the display 53 might not be known. Moreover, when the user operates (moves) the substrate 60 with a wrong posture, in spite of a fact that the user is under the impression of having bent the substrate 60 correctly, there is a fear that the intention of the user is not reflected correctly on the display 53. Therefore, it is preferable that a printer 51 has a structure which makes the user identify a regular usage posture (attitude) or a structure which makes the user identify the current posture of the substrate 60. Some examples of such structure will be described below.

Figure 21:
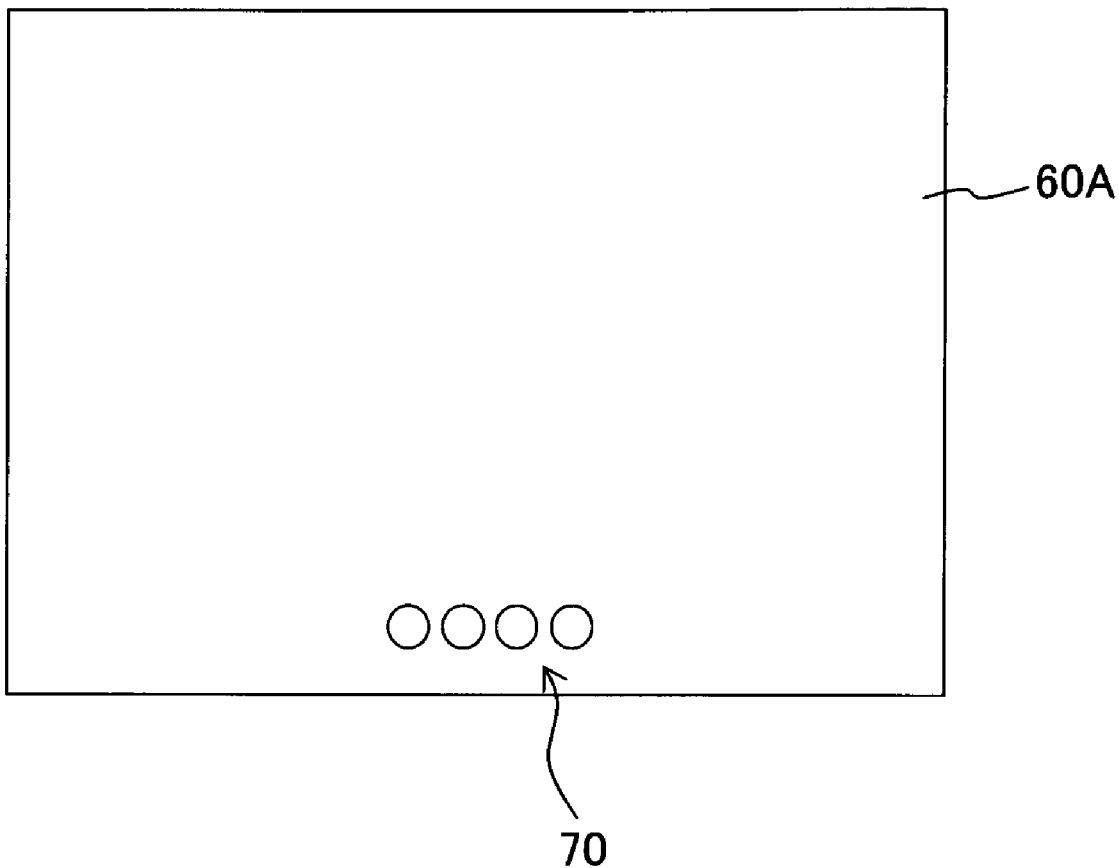
FIG. 21 is a diagram showing an example of a substrate having a posture (attitude) identifying section.

A posture identifying section (An attitude identifying section) which makes the user identify a regular usage posture (attitude) may be provided to the substrate 60. For example, as shown in FIG. 21, an identifying section 70 including characters or a mark etc. on a part thereof may be provided to a substrate 60A. In this case, the user can make out at a glance whether the substrate 60A is at the regular posture by checking if the identifying section 70 including the characters or marks is inclined or in opposite direction. Moreover, an arrow mark or a message indicating as to which direction of the substrate 60 is an upper portion in the regular usage posture may be disclosed on the substrate 60.

Figure 22:
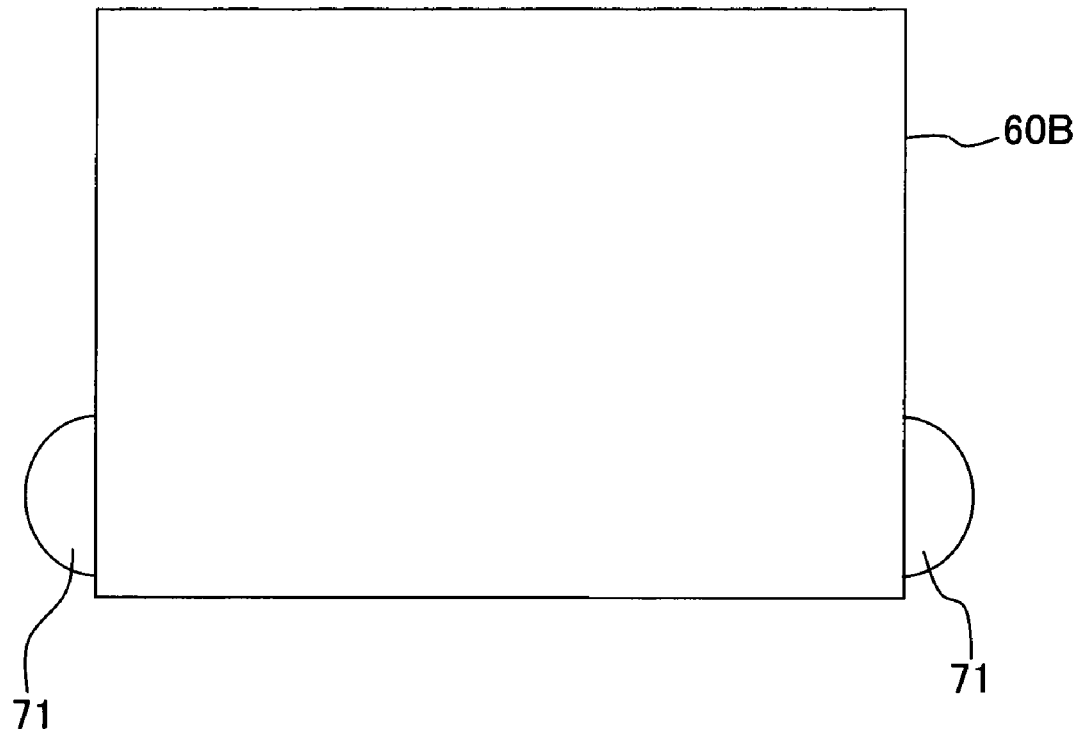
FIG. 22 is a diagram showing another example of a substrate having the posture identifying section.

Alternatively, as shown in FIG. 22, a pair of handles 71 (knob) may be provided in both a left side and a right side of a substrate 60B at the regular usage attitude. In this case, the user is capable of identifying at once the regular usage posture (attitude) of the substrate 60B.

Figure 23A:
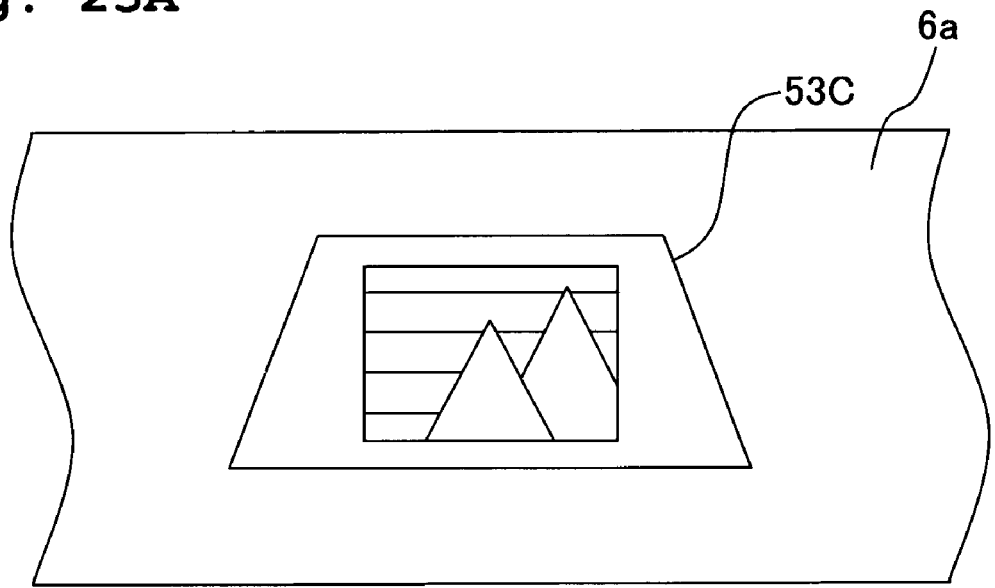
FIGS. 23A and 23B are diagrams showing still other examples of a substrate having the posture identifying section.
Figure 23B:
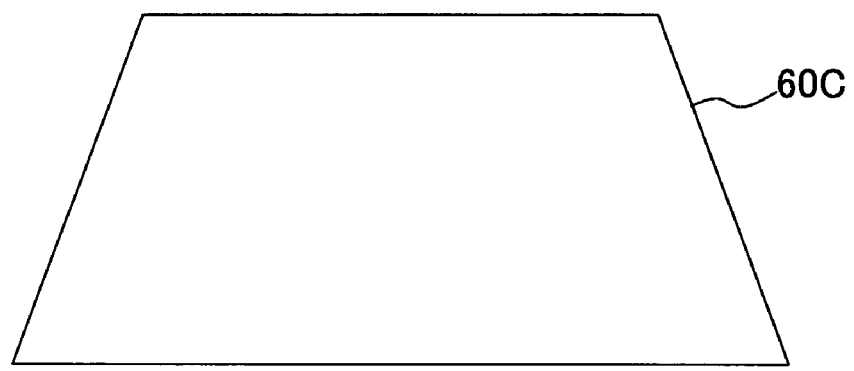

Furthermore, a display 53C arranged on the inclined surface 6a of the printer-body 6 may have a vertically asymmetrical shape such as a trapezoidal shape as shown in FIG. 23A, and a substrate 60C may have a shape almost similar to the shape of the display 53C as shown in FIG. 23B. In this case, it is possible to identify at a glance, the regular usage posture of the substrate 60C corresponding to the display 53C. In this case, an external shape of the substrate 60 functions as a posture identifying section which makes the user identify the regular usage posture.

In this manner, when the posture identifying section for identifying the usage posture of the substrate 60 is provided, the user, at the time of operating the substrate 60, is capable of identifying immediately as to by bending the substrate 60 at which posture, it is possible to carry out correctly the image change of the display 53.

Figure 24:
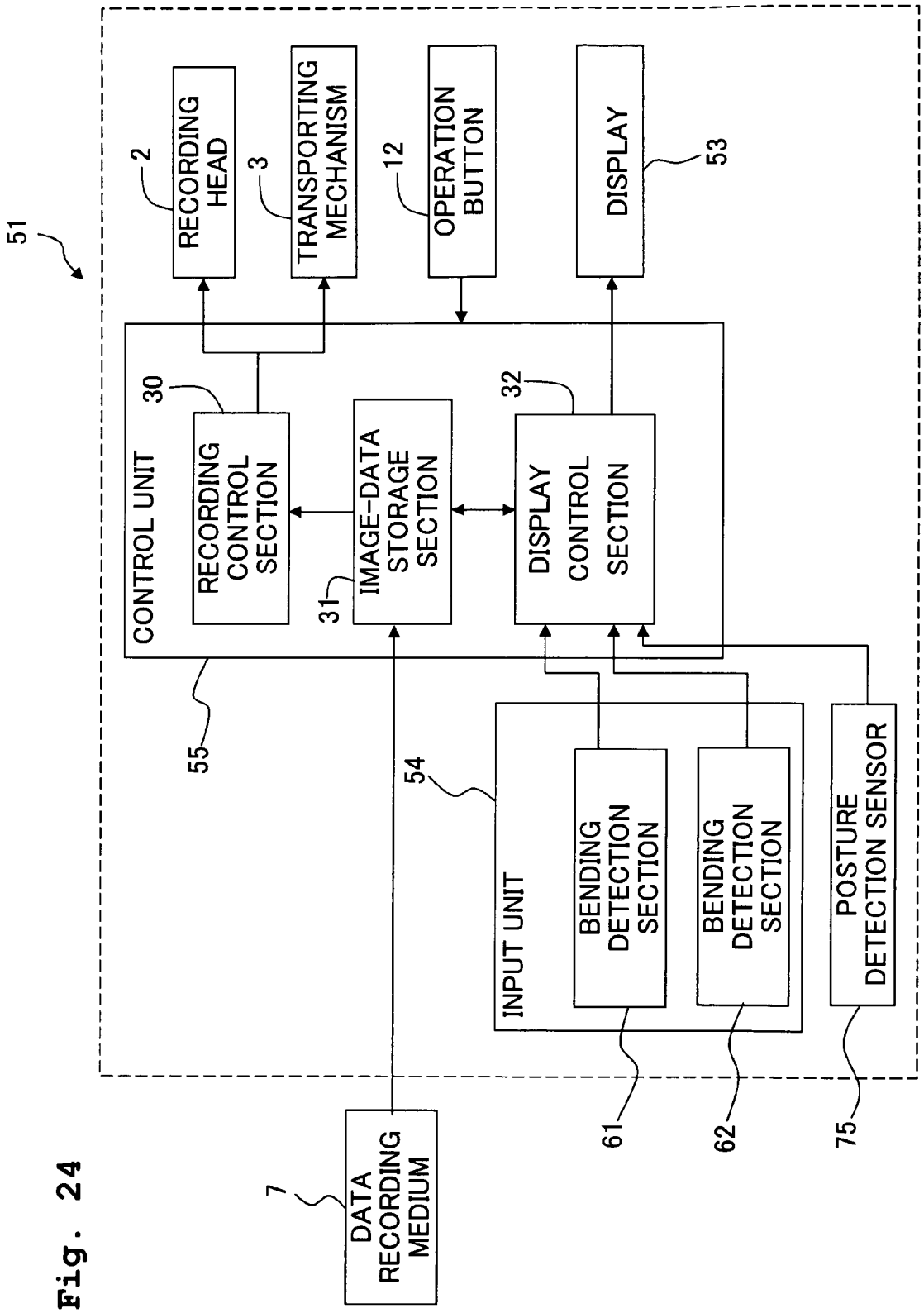
FIG. 24 is a block diagram showing schematically an electrical structure of a printer, in a form including a posture (attitude) detecting sensor.

The printer 51 may include a structure (posture detection section) which detects a posture of the substrate 60. For example, as shown in FIG. 24, the printer 51 may include a posture detection sensor 75 made of a sensor such as a magnetic sensor which detects the posture of the substrate 60 operated at a location away from the printer-body 6. In this case, the control unit 55 of the printer 51 is capable of making a judgment of whether or not the substrate 60 is at the regular usage posture, from a detection result of the posture detection sensor 75. Therefore, when the substrate 60 is not at the regular usage posture, it is possible to inform the user by displaying an error message on the display 53.

Alternatively, when the user bends the substrate 60 on a trial basis, the posture of the substrate 60 can be detected from a result of the trial. In this case, firstly, a message requesting the user to bend the substrate 60 once on a trial basis is displayed on the display 53 before actually operating the input unit 54 (for example, immediately after the input unit 54 is removed by the user from a holder (not shown in the diagram) which sets the input unit 54 when not in use). Regarding the necessity of the trial bending operation, it is not necessarily required to inform immediately before the operation of the input unit 54 by the user, and may be notified (informed) to the user in advance by mentioning in a manual of the printer 51 or on a disclaimer which is stuck to the printer-body 6 or the input unit 54.

Moreover, when the substrate 60 is bent on a trial basis by the user, the control unit 55 detects the posture of the substrate 60 based on the bending deformation of the substrate 60 detected by the bending detections sections 61 and 62 (the first bending detection section 61 and the second bending detection section 62). For example, when the bending detection sections 61 and 62 are provided at a right end portion of the substrate 60 which is at the regular usage posture, an instruction is given to the user to bend the right end portion of the substrate 60 inwardly (toward the user) on a trial basis, as it is in the current posture. In this case, from a result of the detection by the bending detections sections 61 and 62 (the first bending detections section 61 and the second bending detection section 62), when it is identified that the right end portion of the substrate 60 has been bent in accordance with the instruction, the control unit 55 makes a judgment that the current posture is a regular usage posture. Whereas, although the user is supposed to have been instructed to bend the right end portion of the substrate 60 on a trial basis, when it is identified from the result of detection by the bending detection sections 61 and 62 that a left end portion of the substrate 60 has been bent, the control unit 55 makes a judgment that the current posture is a posture in which the left and right sides of the regular usage posture are reversed. In this case, the control unit 55 corresponds a posture detection section which detects the posture of the substrate 60 based on the result of detection by the bending detection sections 61 and 62.

In this manner, when the trial bending is carried out by the user, and when the control unit 55 is capable of identifying the posture of the substrate 60 from the detection result of the bending detection, a special sensor (the posture detection sensor 75) for detecting the posture of the substrate 60 is unnecessary.

The regular posture of the substrate 60 may not be necessarily determined in advance. The posture of the substrate 60 may be detected based on the detection result of the bending deformation when the trial bending as described above has been carried out. In this case, an instruction from the user thereafter can be judged from the posture of the substrate 60 which has been detected. For instance, when a bending detection sections are arranged at four corners of a rectangular shaped substrate 60, after giving an instruction to the user to bend an upper right corner (of the substrate 60) inwardly (toward the user) on the trial basis, when a site which the user has actually bent is detected, it is possible to detect the current posture of the substrate 60. Alternatively, it is also allowable that after detecting the posture of the substrate 60 (after detecting the user is holding the substrate 60 in which posture), the current posture of the substrate 60 is newly registered on the control unit as the normal or regular posture. Namely, the correlation between the output from each of the detecting sections and the process content is changed such that the operation by the user and the image processing operation of the control unit intended by the user are coincident. Still alternatively, in a case that the display is provided integrally with the input unit 54, it is allowable that an image is displayed on the display by changing the up-down and left-right orientations and/or the arrangement of the image such that the user can see the image appropriately in the posture in which the substrate is currently held by the user.

Third Embodiment

The input unit integrated with the display in the first embodiment is to be used by connecting to the printer including a recording head. However, an apparatus in which a display and an input unit are integrated can be used independently as an image display apparatus.

Figure 25:
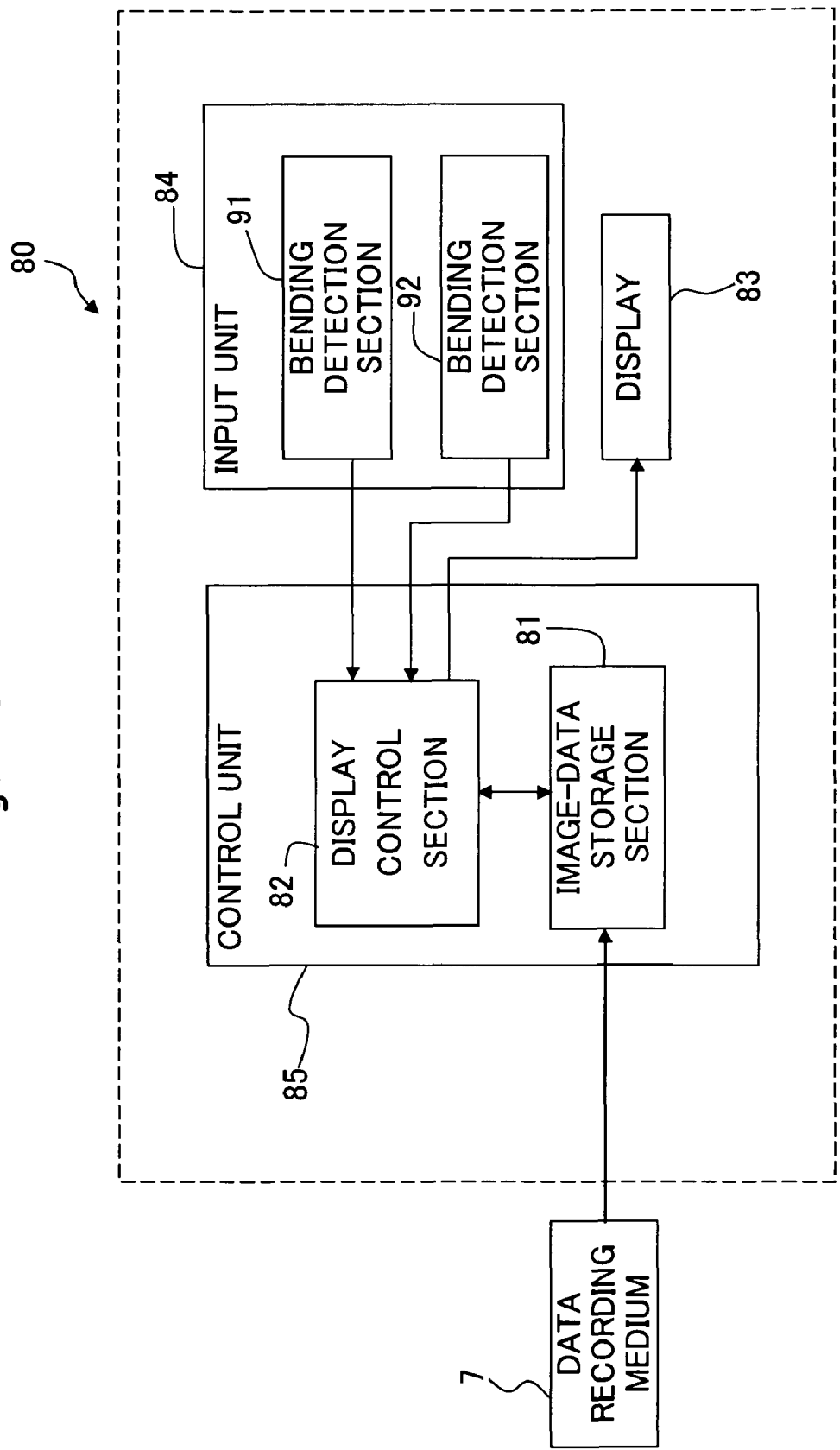
FIG. 25 is a block diagram showing schematically an electrical structure of an image display apparatus according to a third embodiment

FIG. 25 is a block diagram showing schematically an electrical structure of an image display apparatus 80 according to a third embodiment. The image display apparatus 80 includes an input unit 84 which includes a substrate and two bending detections sections 91 and 92 (a first bending detection section 91 and a second bending detection section 92) which detect the bending deformation of the substrate, a display 83 having flexibility which is deformable by being bent integrally with the substrate, and a control unit 85 which controls the display 83 based on a result of detection by the bending detection sections 91 and 92.

Similarly as the structure in the first embodiment, when the substrate is bent by the user, the input unit 84 detects the bending deformation occurred in the substrate by the bending detection sections 91 and 92. Moreover, a display control section 82 of the control unit 85 which controls the display 83 changes an image to be displayed on the display 83 based on the bending deformation of the substrate detected by the bending detection sections 91 and 92.

However, the image display apparatus 80 of the third embodiment has the control unit 85 formed by the CPU, the ROM, and the RAM etc., which is accommodated in the apparatus. Therefore, it is possible to store image data input from a data recording medium, in an image-data storage section 81 in the control unit 85. Moreover, when the user has bent the substrate, it is possible to display an image on the display 83 upon extracting image data from the image-data storage section 81 according to the mode of the bending deformation occurred in the substrate. In other words, it is possible to display an image on the display 83 without connecting to an equipment such as a printer. As a matter of course, it is also possible to use by connecting to a printer etc. as in the first embodiment.

Fourth Embodiment

Figure 26:
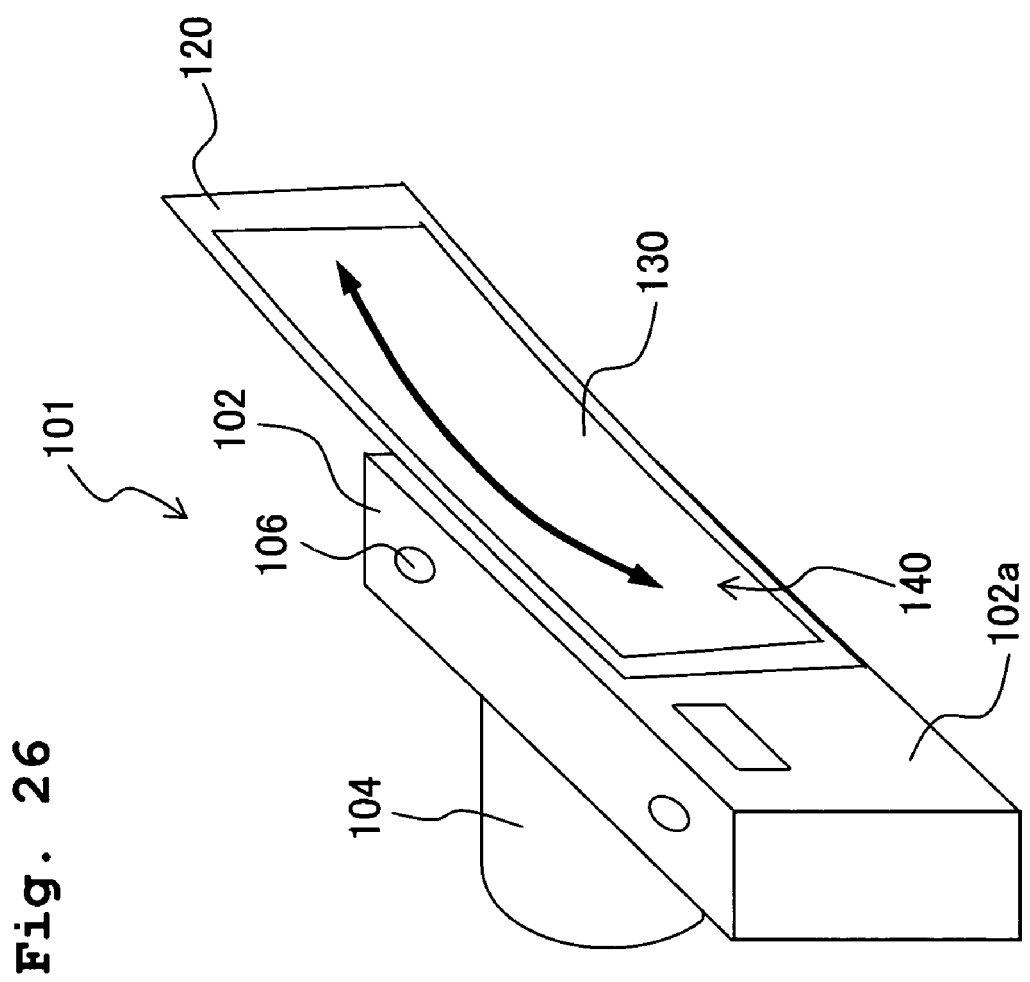
FIG. 26 is a schematic perspective view of a digital camera according to a forth embodiment of the present invention.
Figure 27:
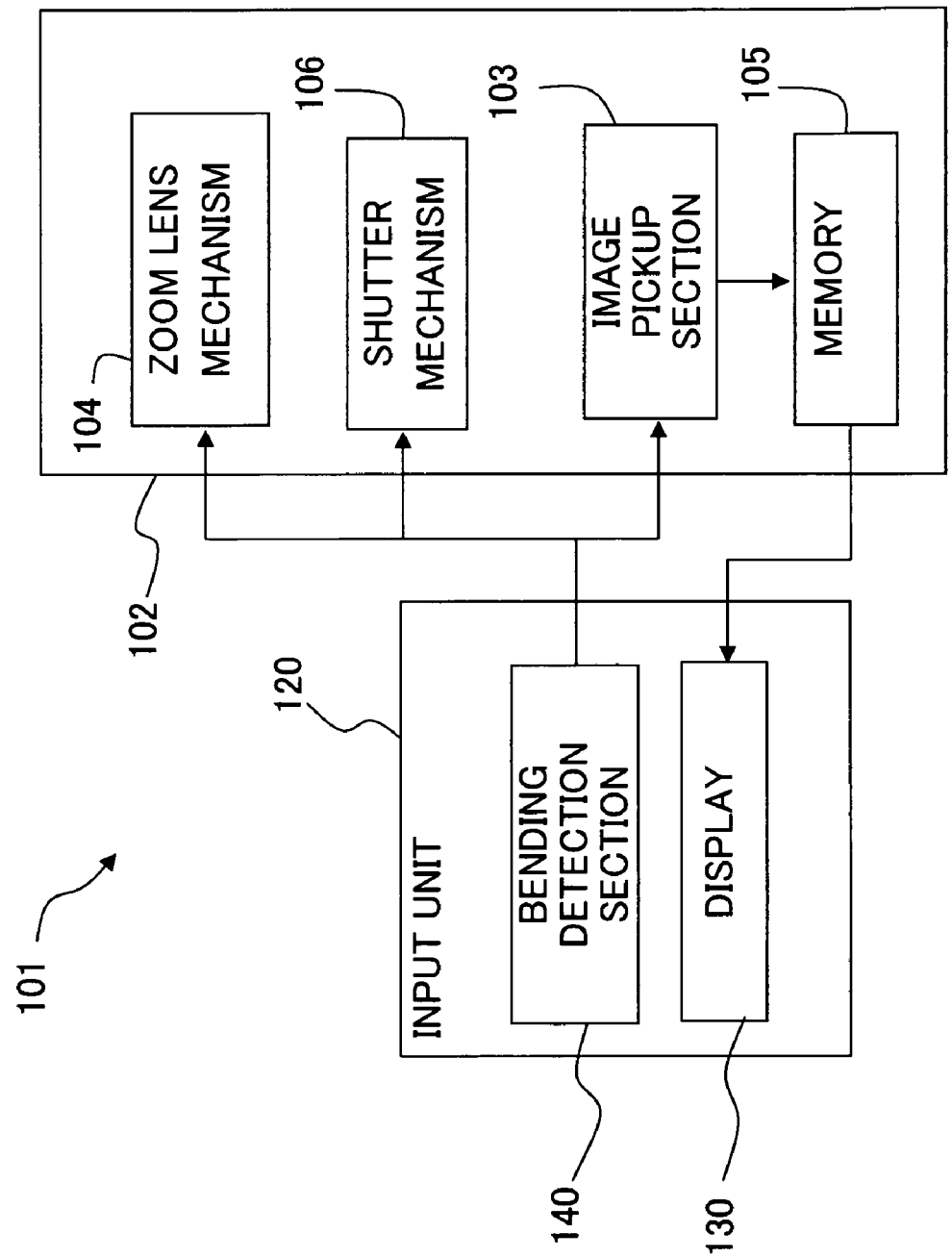
FIG. 27 is a block diagram showing schematically an electrical structure of the digital camera according to the forth embodiment.

The input unit integrated with the display in the first embodiment is connected to the printer provided with the recording head. Moreover, the image data of the image to be displayed on the display of the input unit is created based on the image data in the data recording medium. Whereas, in the fourth embodiment, instead of the data recording medium and the printer, an image acquiring unit and a control mechanism thereof respectively are connected to the input unit. The image acquiring unit may be a digital camera and a digital video camera for example, and the control unit thereof is a mechanism such as a zoom (zooming) mechanism, a shutter mechanism, and a recording mechanism. For example, as shown in FIG. 26, a digital camera 101 has a camera 102, and an input unit 120 which is arranged in a body 102a of the camera 102. As shown in FIG. 27, the camera 102 includes mainly an image pickup section 103 such as a Charge Coupled Device (CCD), a zoom lens mechanism 104, a memory 105 which stores an image recorded by the image pickup section 103, and a shutter mechanism 106. The input unit 120 is similar to the input unit in the embodiments described above, and has a display 130 and a bending detection section 140. Here, an image picked up by the image pickup section 103 through the zoom lens mechanism 104 is displayed on the display 130. Similarly as the operation of displaying the enlarged image and the reduced image in the first embodiment, by operating the input unit 120, it is possible to enlarge and reduce an image to be displayed on the display 130. Here, when an instruction to enlarge (reduce) an image is input to the input unit 120, an image picked up by the image pickup section 103 is enlarged (reduced) by operating the zoom lens mechanism 104. Accordingly, the image to be displayed on the display 130 is enlarged (reduced). When an instruction similar to the instruction of printing as in the first embodiment is input, it is possible to operate the shutter mechanism 106 to take in a memory the image picked up in the image pickup section 103. When the abovementioned input unit is connected to a digital video camera instead of a digital camera, it is possible to carry out an operation of a similar intention also for the digital video camera. Here, the input unit 120 may not be formed integrally with the body 102a, and may be provided independently of the camera 102.

In the embodiments and the modified embodiments described above, the shape of the substrate of the input unit may be arbitrary. Moreover, the arrangement of the bending detection section to be arranged on the substrate is not restricted to the arrangement in the abovementioned embodiments and the modified embodiments, and the bending detection section may be arranged at an arbitrary position on the substrate, provided that it is possible to detect the bending at a target (intended) site.

Note that in FIGS. 8A, 10B, 12B and 18B corresponding to the above-described embodiments and modifications, the indication of "GND" does not necessarily mean that the electric potential difference is 0 (zero). For example, it is also allowable that: (1) a case that the potential difference is not more than a predetermined threshold value is considered as "GND", or (2) among the potential differences detected in the first bending-detection section and the second bending-detection section, a potential difference of which absolute value is smaller is considered as "GND", etc. In this case, even when the user bends the substrate in a slightly oblique direction, the image process can be performed in the same manner as when the user bends the substrate in a straight direction. This makes it possible to make the apparatus more user-friendly or easier to use. Alternatively, it is allowable that the potential difference detected by each of the first bending-detection section and the second bending-detection section is positively picked up so as to further detect an oblique bending (for example, bending in a direction of an axis located at a position between the bending axes C1 and C2) as well. For example, when the substrate is bend obliquely downwardly in the first embodiment, then the first bending-detection section detects "+" and the second bending-detection section detects "+". This can be set as an intentional operation by the user, so that a new image-process can be instructed to and executed by the apparatus.

What is claimed is:

1. An image display apparatus which displays an image, comprising:
   a display which displays an image;
   an input mechanism which has a flexible and sheet shaped substrate, and a bending detection mechanism which is arranged on a surface of the substrate to detect a bending deformation of the substrate;
   a display control mechanism which controls to change an image to be displayed on the display, based on the bending deformation of the substrate detected by the bending detection mechanism of the input mechanism, and
   an image recording section which records an image on a recording medium; and an image control section which controls the image recording section to record an image displayed on the display on a recording medium;
   wherein when the recording control section judges that the bending deformation of the substrate detected by the bending deformation mechanism is of a type different from a bending deformation which changes the image to be displayed on the display, the recording control section controls the image recording section to record the displayed image on recording paper.

2. The image display apparatus according to claim 1, wherein when the bending deformation of the substrate is detected by the bending detecting mechanism, the display control mechanism controls the display to enlarge or reduce a displayed image which is currently displayed on the display.

3. The image display apparatus according to claim 2, wherein the display control mechanism controls the display to enlarge the displayed image when the display control mechanism judges that the substrate is bent to form a projection upward, based on a detection result of the bending detection mechanism, and the display control mechanism controls the display section to reduce the displayed image when the display control mechanism judges that the substrate is bent to form a projection downward, based on a detection result of the bending detection mechanism.

4. The image display apparatus according to claim 2, wherein the bending detection mechanism has a plurality of bending detection sections arranged in a plurality of areas respectively, of the surface of the substrate, and when the bending deformation of the substrate is detected by one of the bending detection sections, the display control mechanism controls the display to enlarge or reduce the displayed image such that a portion, of the displayed image, corresponding to an area of the substrate arranged the one of the bending detection sections is to be a center of the enlargement or the reduction of the displayed image.

5. The image display apparatus according to claim 1, wherein the display control mechanism controls the display to display a image-list including a plurality of images at a time, and when the bending deformation of the substrate is detected by the bending detection mechanism, the display control mechanism changes the number of images in the image-list to be displayed on the display.

6. The image display apparatus according to claim 1, wherein when the bending deformation of the substrate is detected by the bending detection mechanism, the display control mechanism changes an image displayed on the display to another image different from the displayed image.

7. The image display apparatus according to claim 1, wherein the substrate is formed of a rectangular sheet material, and when the recording control section judges that a corner portion of the rectangular substrate has been bent, based on the detection result of the bending detection section, the recording control section controls the image recording section to record the displayed image on a recording medium.

8. The image display apparatus according to claim 1, wherein the bending detection mechanism has a plurality of the bending detection sections arranged on the plurality of areas respectively of the surface of the substrate.

9. The image display apparatus according to claim 1, wherein the bending detection mechanism has a piezoelectric layer provided on a surface of the substrate, and a first electrode and a second electrode which are arranged on a surface of the piezoelectric layer, and which are extended in parallel at an interval.

10. The image display apparatus according to claim 9, wherein the first electrode includes a plurality of first individual electrodes extending in one direction and being electrically conducted with each other, the second electrode includes a plurality of second individual electrodes extending in the one direction and being electrically conducted with each other, and the first and second individual electrodes are arranged alternately on the one surface of the piezoelectric layer.

11. The image display apparatus according to claim 9, wherein the bending detection mechanism includes a plurality of bending detection sections arranged on one surface of the substrate, and each of the bending detection sections includes the first electrode and the second electrode which are mutually parallel, and a direction of extension of the first and second electrodes is different among the bending detection sections.

12. The image display apparatus according to claim 1, wherein the bending detection mechanism has a piezoelectric layer provided on a surface of the substrate, and a first electrode arranged on one surface of the piezoelectric layer, and a second electrode arranged on the other surface of the piezoelectric layer.

13. The image display apparatus according to claim 1, wherein the bending detection mechanism has an electrical resistor which is formed of an electroconductive material arranged on a surface of the substrate, and of which an electrical resistance changes depending on the bending deformation of the substrate.

14. The image display apparatus according to claim 1, wherein the bending detection mechanism has a plurality of acceleration sensors arranged on a surface of the substrate.

15. The image display apparatus according to claim 1, wherein the substrate is provided with an posture identifying section which identifies a regular usage posture corresponding to an image displayed on the display.

16. The image display apparatus according to claim 1, further comprising a posture detecting section which detects a posture of the substrate.

17. The image display apparatus according to claim 16, wherein when a bending deformation has occurred in the substrate due to bending the substrate on a trial basis, the posture detecting section detects the posture of the substrate based on a detection result of the bending detection mechanism.

18. The image display apparatus according to claim 1, further comprising an image-taking unit which has an image pickup section which picks up an image; and a control unit which controls operations of the image-taking unit, wherein the display displays an image picked up by the image pickup section, and the control unit controls the operations of the image acquiring unit based on a detection result from the bending detection mechanism.

19. The image display apparatus according to claim 1, the display as a whole has a flexibility, and the display is provided on the substrate, and is deformable by bending integrally with the substrate.

20. The image display apparatus according to claim 1, wherein the display is provided to be separated from the substrate.

* * * * *